(12) United States Patent
Pan et al.

(10) Patent No.: US 12,192,264 B2
(45) Date of Patent: Jan. 7, 2025

(54) NETWORK-BASED ADAPTIVE STREAMING MEDIA PARAMETER ADJUSTMENT METHOD AND AN APPARATUS

(71) Applicant: HUAWEI TECHNOLOGIES CO., LTD., Guangdong (CN)

(72) Inventors: Qi Pan, Beijing (CN); Zhenglei Huang, Beijing (CN); Hui Ni, Beijing (CN); Yongcui Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/973,096

(22) Filed: Oct. 25, 2022

(65) Prior Publication Data

US 2023/0038430 A1 Feb. 9, 2023

Related U.S. Application Data

(63) Continuation of application No. PCT/CN2020/087090, filed on Apr. 26, 2020.

(51) Int. Cl.
*H04L 65/80* (2022.01)
*H04L 65/61* (2022.01)

(52) U.S. Cl.
CPC .............. *H04L 65/80* (2013.01); *H04L 65/61* (2022.05)

(58) Field of Classification Search
CPC ..... H04L 65/80; H04L 65/61; H04N 21/2343; H04N 21/23805; H04N 21/64738;
(Continued)

(56) References Cited

U.S. PATENT DOCUMENTS

2005/0076136 A1 4/2005 Cho et al.
2010/0299552 A1 11/2010 Schlack et al.
(Continued)

FOREIGN PATENT DOCUMENTS

CN 101068236 A 11/2007
CN 102111381 A 6/2011
(Continued)

OTHER PUBLICATIONS

Extended European Search Report in European Appln No. 20933505.8, dated Feb. 17, 2023, 11 pages.
(Continued)

*Primary Examiner* — Oanh Duong
(74) *Attorney, Agent, or Firm* — Fish & Richardson P.C.

(57) ABSTRACT

Example network-based adaptive streaming media parameter adjustment methods and apparatuses are disclosed. One example method includes receiving, by an access network device, media QoS information from a session management network element, where the media QoS information includes at least two bit rate indicators and QoS requirement information corresponding to each of the bit rate indicators. The access network device determines, based on a current network condition and the media QoS information, a target bit rate indicator from the at least two bit rate indicators. The target bit rate indicator is sent to a terminal or a video server, where the current network condition meets a network requirement for transmitting streaming media data at a bit rate indicated by the target bit rate indicator.

19 Claims, 8 Drawing Sheets

(58) Field of Classification Search
CPC ....... H04N 21/64753; H04N 21/64761; H04N 21/64723
See application file for complete search history.

(56) References Cited

U.S. PATENT DOCUMENTS

| | | | |
|---|---|---|---|
| 2012/0144336 A1 | 6/2012 | Pinter et al. | |
| 2014/0192799 A1* | 7/2014 | Huang | H04L 47/83 370/468 |
| 2015/0023404 A1* | 1/2015 | Li | H04L 65/612 375/240.02 |
| 2017/0332282 A1 | 11/2017 | Dao | |
| 2019/0069039 A1 | 2/2019 | Phillips | |
| 2019/0190965 A1 | 6/2019 | Pinter et al. | |
| 2020/0404739 A1* | 12/2020 | Thiebaut | H04W 76/40 |

FOREIGN PATENT DOCUMENTS

| | | |
|---|---|---|
| CN | 102498715 A | 6/2012 |
| CN | 103167318 A | 6/2013 |
| CN | 103313095 A | 9/2013 |
| CN | 104244028 A | 12/2014 |
| CN | 104349178 A | 2/2015 |
| CN | 104717555 A | 6/2015 |
| CN | 105162555 A | 12/2015 |
| CN | 106507024 A | 3/2017 |
| CN | 107637045 A | 1/2018 |
| CN | 107800665 A | 3/2018 |
| CN | 108259948 A | 7/2018 |
| CN | 109040801 A | 12/2018 |
| CN | 109769125 A | 5/2019 |
| CN | 110191315 A | 8/2019 |
| CN | 110830821 A | 2/2020 |
| WO | 2014169588 A1 | 10/2014 |
| WO | 2015143674 A1 | 10/2015 |
| WO | 2015192683 A1 | 12/2015 |
| WO | 2018040988 A1 | 3/2018 |
| WO | 2019153930 A1 | 8/2019 |
| WO | 2020007202 A1 | 1/2020 |
| WO | 2020015678 A1 | 1/2020 |

OTHER PUBLICATIONS

Akhshabi et al., "An Experimental Evaluation of Rate-Adaptive Video Players over HTTP," Signal Processing: Image Communication, vol. 27, Issue 4, Apr. 2012, 17 pages.

3GPP TS 23.501 V16.4.0, "3rd Generation Partnership Project; Technical Specification Group Services and System Aspects; System Architecture for the 5G System (5GS); Stage 2 (Release 16)," Mar. 2020, 430 pages.

International Search Report and Written Opinion in International Appln. No. PCT/CN2020/087090, mailed on Dec. 30, 2020, 17 pages (with English translation).

* cited by examiner

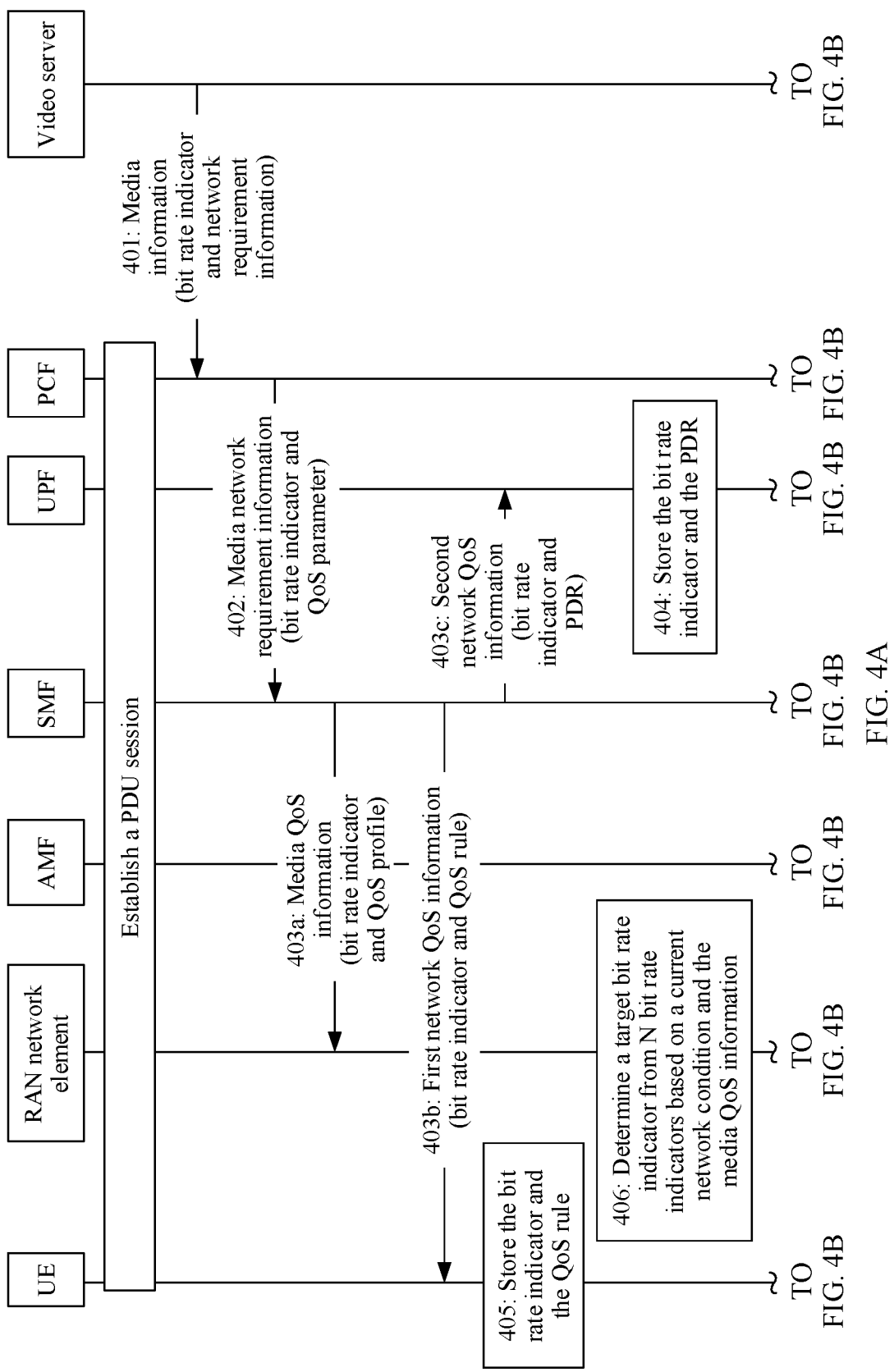

NETWORK-BASED ADAPTIVE STREAMING MEDIA PARAMETER ADJUSTMENT METHOD AND AN APPARATUS

CROSS-REFERENCE TO RELATED APPLICATIONS

This application is a continuation of International Application No. PCT/CN2020/087090, filed on Apr. 26, 2020, the disclosure of which is hereby incorporated by reference in its entirety.

TECHNICAL FIELD

This application relates to the field of communication technologies, and in particular, to a network-based adaptive streaming media parameter adjustment method and an apparatus.

BACKGROUND

Users may watch videos such as live broadcast, TV series, movies, or variety shows in real time via video clients (for example, Tencent Video and Youku Video) installed on terminals such as mobile phones or tablet computers. For example, users may set streaming media parameters (for example, a bit rate or a resolution of streaming media data) on the video clients depending on users' image quality requirements for videos. For example, the streaming media parameter is the resolution of streaming media data. The terminal sends a streaming media data obtaining request to a video server based on a bit rate corresponding to the resolution of the streaming media data set by the user on the video client. After receiving the streaming media data obtaining request sent by the terminal, the video server returns the streaming media data to the terminal, where a bit rate of the streaming media data returned by the video server to the terminal is the same as the bit rate corresponding to the resolution of the streaming media data set by the user on the video client. For example, the resolution of the streaming media data set by the user on the video client is 1080P. If a bit rate corresponding to 1080P is 10 Mbps, the terminal sends a streaming media data obtaining request to the video server, and the bit rate of the streaming media data returned by the video server to the terminal is 10 Mbps.

A higher bit rate of the streaming media data indicates clearer video quality. A higher bit rate of the streaming media data indicates a higher transmission requirement of streaming media data on a network. In the case of a poor network condition, if the bit rate corresponding to the resolution of the streaming media data set by the user on the video client is high, frame freezing is prone to occur during video playing, affecting user experience. Therefore, the network-based adaptive streaming media bit rate adjustment technique is introduced. For example, when the resolution of the streaming media data set by the user on the video client is adaptive, the terminal dynamically adjusts the bit rate of the streaming media data based on network condition information such as a packet loss rate of the streaming media data and a network throughput, and then sends a streaming media data obtaining request to the video server based on an adjusted bit rate of the streaming media data. For example, the network condition information such as the packet loss rate of the streaming media data and the network throughput is a statistically collected average value of the terminal within a period of time. Although the network condition information such as the packet loss rate of the streaming media data and the network throughput can be used to measure a network condition within the period of time, the network condition information actually lags behind changes of the network condition. In other words, a current change of the network condition cannot be correctly measured based on historically statistically collected average value. Therefore, using the existing technical solution of network-based adaptive streaming media bit rate adjustment is prone to result in the following problem: Adjustment of the bit rate of the streaming media data lags behind changes of the network condition. Consequently, frame freezing is prone to occur during video playing, affecting user experience.

SUMMARY

This application provides a network-based adaptive streaming media parameter adjustment method, to allow adjustment of streaming media parameters (for example, a bit rate, a resolution, or a frame rate of streaming media data) to adapt to changes of a network condition, to improve user experience.

According to a first aspect, an embodiment of this application provides a network-based adaptive streaming media parameter adjustment method. The method specifically includes: An access network device receives media quality of service (QoS) information from a session management network element, where the media QoS information includes at least two streaming media parameter indicators and QoS requirement information corresponding to each of the at least two streaming media parameter indicators, and each streaming media parameter indicator indicates a streaming media parameter supported by a video server; and then the access network device determines a target streaming media parameter indicator from the at least two streaming media parameter indicators based on a current network condition and the media QoS information, and sends the target streaming media parameter indicators in the at least two streaming media parameter indicators to a terminal or the video server, where the current network condition meets a network requirement for transmitting streaming media data at a streaming media parameter indicated by the target streaming media parameter indicator. For example, in this embodiment of this application, the streaming media parameter includes at least one of a bit rate, a resolution, or a frame rate. For example, if the streaming media parameter is a bit rate, the streaming media parameter indicator may be understood as a bit rate indicator.

In this embodiment of this application, because the target streaming media parameter indicator is determined by the access network device based on the current network condition and the media QoS information, the terminal or the video server may transmit streaming media data based on the target streaming media parameter indicator. In other words, a streaming media parameter of the streaming media data transmitted between the video server and the terminal is adjusted by the access network device based on the current network condition. Compared with the current technology, adjustment of the streaming media parameter can adapt to the current network condition. Therefore, a user can watch a video with clearer image quality on the terminal in real time in the case of a good network condition, and streaming media data with poor image quality is transmitted when the network condition deteriorates. This helps reduce a possibility of video freezing when the user watches a video on the terminal in real time, to improve user experience.

In a possible design, QoS requirement information corresponding to each streaming media parameter indicator indicates a network requirement for transmitting streaming media data at a streaming media parameter indicated by a corresponding streaming media parameter indicator.

In a possible design, the access network device determines, based on the current network condition and the media QoS information, the target streaming media parameter indicator from the at least two streaming media parameter indicators in the following manner.

The access network device monitors a network bandwidth; and when a difference, within a target range, between the network bandwidth detected by the access network device and a target network bandwidth lasts for target duration, the access network device determines, as the target streaming media parameter indicator from the at least two streaming media parameter indicators, a streaming media parameter indicator that indicates a streaming media parameter at which the network bandwidth required for transmitting the streaming media data is the target network bandwidth. This helps simplify a manner of determining the target streaming media parameter indicator.

In a possible design, the media QoS information further includes buffer information, where the buffer information indicates minimum buffer duration required for allowing video playing by the terminal, and the target duration is less than or equal to the minimum buffer duration. Therefore, the streaming media parameter indicated by the determined target streaming media parameter indicator is more suitable for the current network condition.

In a possible design, the access network device determines the target duration based on the buffer information. Therefore, the access network device can determine different target duration when buffer information of different terminals is different. This helps improve flexibility of network-based adaptive adjustment for a streaming media parameter.

In a possible design, the media QoS information further includes: a media indicator, where the media indicator indicates a streaming media service of a network-based adaptive streaming media parameter. This helps indicate the access network device to adjust, based on the current network condition and the media QoS information, the streaming media parameter of the streaming media data transmitted between the terminal and the video server.

In a possible design, the QoS requirement information corresponding to each streaming media parameter indicator includes a QoS profile corresponding to each streaming media parameter indicator.

In a possible design, the access network device performs, based on the QoS profile corresponding to the target streaming media parameter indicator, QoS parameter configuration on a protocol data unit (PDU) session for streaming media data transmission, and sends the target streaming media parameter indicator to a user plane network element. Therefore, a network-based adaptive streaming media parameter adjustment method may be applicable to a service scenario of a guaranteed bit rate (GBR).

In a possible design, the access network device sends streaming media parameter information to the terminal, where the streaming media parameter information includes the at least two streaming media parameter indicators. This helps simplify a manner in which the terminal obtains the streaming media parameter indicators of at least two streaming media parameters supported by the video server.

In a possible design, the access network device may send target streaming media parameter indicators in the at least two streaming media parameter indicators to the terminal or the video server in the following manner.

The access network device sends the target streaming media parameter indicator via a radio resource control (RRC) message to the terminal or the video server; or the access network device sends the target streaming media parameter indicator via header information of a user plane downlink message to the terminal or the video server. This helps simplify the implementation.

According to a second aspect, an embodiment of this application provides a network-based adaptive streaming media parameter adjustment method. The method specifically includes:

A policy control network element receives media information from a video server, where the media information includes at least two streaming media parameter indicators and network requirement information for transmitting streaming media data at a streaming media parameter indicated by each of the at least two streaming media parameter indicators, and each streaming media parameter indicator indicates a streaming media parameter supported by the video server; and the policy control network element sends media network requirement information to a session management network element, where the media network requirement information includes the at least two streaming media parameter indicators and QoS information corresponding to each of the at least two streaming media parameter indicators, and the QoS information corresponding to each streaming media parameter indicator indicates a network requirement for transmitting streaming media data at a streaming media parameter indicated by a corresponding streaming media parameter indicator.

The foregoing technical solution helps the session management network element obtain the network requirement for transmitting the streaming media data at the streaming media parameter supported by the video server.

In a possible design, the QoS information corresponding to the at least two streaming media parameter indicators is obtained by the policy control network element based on the media information. In this case, the QoS information may be a QoS parameter set.

In a possible design, the media network requirement information further includes buffer information and/or a media indicator, where the buffer information indicates minimum buffer duration required for allowing video playing by a terminal, and the media indicator indicates a streaming media service of a network-based adaptive streaming media parameter. The foregoing technical solution helps simplify a transmission manner of the buffer information and/or the media indicator.

According to a third aspect, an embodiment of this application provides a network-based adaptive streaming media parameter adjustment method. The method specifically includes: A session management network element receives media network requirement information from a policy control network element, where the media network requirement information includes at least two streaming media parameter indicators and quality of service (QoS) information corresponding to each of the at least two streaming media parameter indicators, each streaming media parameter indicator indicates a streaming media parameter supported by a video server, and the QoS information corresponding to each streaming media parameter indicator indicates a network requirement for transmitting streaming media data at a streaming media parameter indicated by a corresponding streaming media parameter indicator; and then the session management network element sends media QoS information to an access network device, where the media QoS information includes at least two streaming media parameter indicators and QoS requirement information corresponding to the at least two streaming media parameter indicators. According to the foregoing technical solution, the access network device can obtain the media QoS information, so that the access network device can adjust, based on the current network condition and the media QoS information, a streaming media parameter of streaming media data transmitted between a terminal and the video server.

In a possible design, QoS requirement information corresponding to each streaming media parameter indicator indicates a network requirement for transmitting streaming media data at a streaming media parameter indicated by a corresponding streaming media parameter indicator.

In a possible design, the QoS requirement information corresponding to each streaming media parameter indicator includes a QoS profile corresponding to each streaming media parameter indicator.

In a possible design, the session management network element sends first network QoS information to the terminal, and sends second network QoS information to a user plane network element, where the first network QoS information includes the at least two streaming media parameter indicators and a QoS rule corresponding to each of the at least two streaming media parameter indicators, and the second network QoS information includes the at least two streaming media parameter indicators and a packet detection rule (PDR) corresponding to each of the at least two streaming media parameter indicators. This helps simplify a manner in which the terminal obtains the first network QoS information, and simplify a manner in which the user plane network element obtains the second network QoS information.

In a possible design, the media QoS information further includes buffer information and/or a media indicator, where the buffer information indicates minimum buffer duration required for allowing video playing by the terminal, and the media indicator indicates a streaming media service of a network-based adaptive streaming media parameter. The foregoing technical solution helps simplify a transmission manner of the buffer information and/or the media indicator.

According to a fourth aspect, an embodiment of this application provides a network-based adaptive streaming media parameter adjustment method. The method specifically includes: A user plane network element receives second network QoS information from a session management network element, where the second network QoS information includes at least two streaming media parameter indicators, and a PDR corresponding to each of the at least two streaming media parameter indicators, and each streaming media parameter indicator indicates a streaming media parameter supported by a video server; the user plane network element receives a target streaming media parameter indicator sent by an access network device, where the target streaming media parameter indicator is one of the at least two streaming media parameter indicators, and a current network condition meets a network requirement for transmitting streaming media data at a streaming media parameter indicated by the target streaming media parameter indicator; and then the user plane network element performs, according to a PDR corresponding to the target streaming media parameter indicator in PDRs corresponding to the at least two streaming media parameter indicators, QoS parameter configuration on a PDU session for streaming media data transmission.

According to the foregoing technical solution, the network-based adaptive streaming media parameter adjustment method in this embodiment of this application may be applicable to a GBR service scenario.

According to a fifth aspect, an embodiment of this application provides a network-based adaptive streaming media parameter adjustment method. The method specifically includes: A video server generates media information, and sends the media information to a policy control network element, where the media information includes at least two streaming media parameter indicators and network requirement information for transmitting streaming media data at a streaming media parameter indicated by each of the at least two streaming media parameter indicators, and each streaming media parameter indicator indicates a streaming media parameter supported by the video server. The foregoing technical solution helps the policy control network element obtain the network requirement for transmitting the streaming media data at the streaming media parameter supported by the video server.

In a possible design, the media relevant information further includes buffer information and/or a media indicator, where the buffer information indicates minimum buffer duration required for allowing video playing by a terminal, and the media indicator indicates a streaming media service of a network-based adaptive streaming media parameter.

In a possible design, the video server sends media manifest to the terminal, where the media manifest includes the at least two streaming media parameter indicators. This helps the terminal obtain the media manifest.

In a possible design, the video server receives a target streaming media parameter indicator sent by an access network device, where a current network condition meets a network requirement for transmitting streaming media data at a streaming media parameter indicated by the target streaming media parameter indicator, and the target streaming media parameter indicator is one of the at least two streaming media parameter indicators; and then the video server sends the streaming media data at the streaming media parameter indicated by the target streaming media parameter indicator to the terminal. Therefore, the video server can send the streaming media data to the terminal based on the target streaming media parameter indicator in the current network condition.

In a possible design, after receiving the target streaming media parameter indicator, the video server sends, to the terminal in response to receiving a streaming media data obtaining request from the terminal, the streaming media data at the streaming media parameter indicated by the target streaming media parameter indicator.

According to a sixth aspect, an embodiment of this application provides a network-based adaptive streaming media parameter adjustment method, which specifically includes: A terminal receives a target streaming media parameter indicator from an access network device, where a current network condition meets a network requirement for transmitting streaming media data at a streaming media parameter indicated by the target streaming media parameter indicator, the target streaming media parameter indicator is one of at least two streaming media parameter indicators, and each of the at least two streaming media parameter indicators indicates a streaming media parameter supported by a video server; and the terminal sends a streaming media data obtaining request to the video server based on the target streaming media parameter indicator, where the streaming media data obtaining request includes a streaming media data obtaining address corresponding to the target streaming media parameter indicator. According to the foregoing technical solution, the terminal may send the streaming media data obtaining request to the video server based on the target streaming media parameter indicator, so that in the current network condition, the video server may return streaming media data of a streaming media parameter identified by the target streaming media parameter indicator to the terminal.

In a possible design, the terminal receives media manifest from the video server, where the media manifest includes the at least two streaming media parameter indicators; or the terminal obtains the at least two streaming media parameter indicators from the access network device. This helps simplify a manner in which the terminal obtains the streaming media parameter supported by the video server.

In a possible design, when current buffer duration is less than or equal to a first threshold, the terminal sends the streaming media data obtaining request to the video server based on the target streaming media parameter indicator.

In a possible design, the terminal receives first network QoS information from a session management network element, where the first network QoS information includes the at least two streaming media parameter indicators and QoS rules corresponding to the at least two streaming media parameter indicators; and then the terminal performs, according to a QoS rule corresponding to the target streaming media parameter indicator, QoS parameter configuration on a PDU session for streaming media data transmission. According to the foregoing technical solution, the network-based adaptive streaming media parameter adjustment method in this embodiment of this application may be applicable to a GBR service scenario.

According to a seventh aspect, an embodiment of this application provides a communication apparatus, specifically including a transceiver unit and a processing unit. The transceiver unit is configured to receive media quality of service (QoS) information from a session management network element, where the media QoS information includes at least two streaming media parameter indicators and QoS requirement information corresponding to each of the at least two streaming media parameter indicators, and each streaming media parameter indicator indicates a streaming media parameter supported by a video server.

The processing unit is configured to determine a target streaming media parameter indicator from the at least two streaming media parameter indicators based on a current network condition and the media QoS information, where the current network condition meets a network requirement for transmitting streaming media data at a streaming media parameter indicated by the target streaming media parameter indicator.

The transceiver unit is further configured to send the target streaming media parameter indicator in the at least two streaming media parameter indicators to a terminal or the video server.

In a possible design, QoS requirement information corresponding to each streaming media parameter indicator indicates a network requirement for transmitting streaming media data at a streaming media parameter indicated by a corresponding streaming media parameter indicator.

In a possible design, the processing unit is configured to determine the target streaming media parameter indicator from the at least two streaming media parameter indicators based on the current network condition and the media QoS information, and specifically:

The processing unit is configured to: monitor a network bandwidth; and when a difference, within a target range, between the network bandwidth detected by the processing unit and a target network bandwidth lasts for target duration, determine, as the target streaming media parameter indicator from the at least two streaming media parameter indicators, a streaming media parameter indicator indicating a streaming media parameter at which the network bandwidth required for transmitting the streaming media data is the target network bandwidth.

In a possible design, the media QoS information further includes buffer information, where the buffer information indicates minimum buffer duration required for allowing video playing by the terminal, and the target duration is less than or equal to the minimum buffer duration.

In a possible design, the processing unit is further configured to determine the target duration based on the buffer information.

In a possible design, the media QoS information further includes: a media indicator, where the media indicator indicates a streaming media service of a network-based adaptive streaming media parameter.

In a possible design, the QoS requirement information corresponding to each streaming media parameter indicator includes a QoS profile corresponding to each streaming media parameter indicator.

In a possible design, the processing unit is further configured to perform, based on the QoS profile corresponding to the target streaming media parameter indicator, QoS parameter configuration on a protocol data unit (PDU) session for streaming media data transmission.

The transceiver unit is further configured to send the target streaming media parameter indicator to a user plane network element.

In a possible design, the transceiver unit is configured to send the target streaming media parameter indicator in the at least two streaming media parameter indicators to the terminal or the video server, and specifically:

The transceiver unit is configured to send the target streaming media parameter indicator via an RRC message to the terminal or the video server; or the transceiver unit is configured to send the target streaming media parameter indicator via header information of a user plane downlink message to the terminal or the video server.

According to an eighth aspect, an embodiment of this application provides a communication apparatus, specifically including a receiving unit and a sending unit.

The receiving unit is configured to receive media information from a video server, where the media information includes at least two streaming media parameter indicators and network requirement information for transmitting streaming media data at a streaming media parameter indicated by each of the at least two streaming media parameter indicators, and each streaming media parameter indicator indicates a streaming media parameter supported by the video server.

The sending unit is configured to send media network requirement information to a session management network element, where the media network requirement information includes the at least two streaming media parameter indicators and quality of service (QoS) information corresponding to each of the at least two streaming media parameter indicators, and the QoS information corresponding to each streaming media parameter indicator indicates a network requirement for transmitting streaming media data at a streaming media parameter indicated by a corresponding streaming media parameter indicator.

In a possible design, the QoS information corresponding to the at least two streaming media parameter indicators is obtained by a policy control network element based on the media information.

In a possible design, the media network requirement information further includes buffer information and/or a media indicator, where the buffer information indicates minimum buffer duration required for allowing video playing by the terminal, and the media indicator indicates a streaming media service of a network-based adaptive streaming media parameter.

According to a ninth aspect, an embodiment of this application provides a communication apparatus, specifically including a receiving unit and a sending unit.

The receiving unit is configured to receive media network requirement information from a policy control network element, where the media network requirement information includes at least two streaming media parameter indicators and quality of service (QoS) information corresponding to each of the at least two streaming media parameter indicators, each streaming media parameter indicator indicates a streaming media parameter supported by a video server, and the QoS information corresponding to each streaming media parameter indicator indicates a network requirement for transmitting streaming media data at a streaming media parameter indicated by a corresponding streaming media parameter indicator.

The sending unit is configured to send media QoS information to an access network device, where the media QoS information includes the at least two streaming media parameter indicators and QoS requirement information corresponding to the at least two streaming media parameter indicators.

In a possible design, QoS requirement information corresponding to each streaming media parameter indicator indicates a network requirement for transmitting streaming media data at a streaming media parameter indicated by a corresponding streaming media parameter indicator.

In a possible design, the QoS requirement information corresponding to each streaming media parameter indicator includes a QoS profile corresponding to each streaming media parameter indicator.

In a possible design, the sending unit is further configured to send first network QoS information to a terminal, and send second network QoS information to a user plane network element, where the first network QoS information includes the at least two streaming media parameter indicators and a QoS rule corresponding to each of the at least two streaming media parameter indicators, and the second network QoS information includes the at least two streaming media parameter indicators and a PDR corresponding to each of the at least two streaming media parameter indicators.

In a possible design, the media QoS information further includes buffer information and/or a media indicator, where the buffer information indicates minimum buffer duration required for allowing video playing by the terminal, and the media indicator indicates a streaming media service of a network-based adaptive streaming media parameter.

According to a tenth aspect, an embodiment of this application provides a communication apparatus, specifically including a transceiver unit and a processing unit.

The transceiver unit is configured to receive second network quality of service (QoS) information from a session management network element, where the second network QoS information includes at least two streaming media parameter indicators and a PDR corresponding to each of the at least two streaming media parameter indicators, and each streaming media parameter indicator indicates a streaming media parameter supported by a video server.

The transceiver unit is further configured to receive a target streaming media parameter indicator sent by an access network device, where the target streaming media parameter indicator is one of the at least two streaming media parameter indicators, and a current network condition meets a network requirement for transmitting streaming media data at a streaming media parameter indicated by the target streaming media parameter indicator.

The processing unit is configured to perform, according to a PDR corresponding to the target streaming media parameter indicator in PDRs corresponding to the at least two streaming media parameter indicators, QoS parameter configuration on a PDU session for streaming media data transmission.

According to an eleventh aspect, an embodiment of this application provides a communication apparatus, specifically including a processing unit and a transceiver unit.

The processing unit is configured to generate media information, where the media information includes at least two streaming media parameter indicators and network requirement information for transmitting streaming media data at a streaming media parameter indicated by each of the at least two streaming media parameter indicators, and each streaming media parameter indicator indicates a streaming media parameter supported by a video server.

The transceiver unit is configured to send the media information to a policy control network element.

In a possible design, the media relevant information further includes buffer information and/or a media indicator, where the buffer information indicates minimum buffer duration required for allowing video playing by the terminal, and the media indicator indicates a streaming media service of a network-based adaptive streaming media parameter.

In a possible design, the transceiver unit is further configured to send media manifest to a terminal, where the media manifest includes the at least two streaming media parameter indicators.

In a possible design, the transceiver unit is further configured to: receive a target streaming media parameter indicator sent by an access network device, and send streaming media data at a streaming media parameter indicator indicated by the target streaming media parameter to a terminal, where a current network condition meets a network requirement for transmitting streaming media data indicated by the target streaming media parameter indicator, and the target streaming media parameter indicator is one of the at least two streaming media parameter indicators.

In a possible design, the transceiver unit is specifically configured to: after receiving the target streaming media parameter indicator, send, to the terminal in response to receiving a streaming media data obtaining request from the terminal, the streaming media data at the streaming media parameter indicated by the target streaming media parameter indicator.

According to a twelfth aspect, an embodiment of this application provides a communication apparatus, specifically including a transceiver unit and a processing unit.

The transceiver unit is configured to receive a target streaming media parameter indicator from an access network device, where a current network condition meets a network requirement for transmitting streaming media data at a streaming media parameter indicated by the target streaming media parameter indicator, the target streaming media parameter indicator is one of at least two streaming media parameter indicators, and each of the at least two streaming media parameter indicators indicates a streaming media parameter supported by a video server.

The processing unit is configured to send a streaming media data obtaining request to the video server based on the target streaming media parameter indicator, where the streaming media data obtaining request includes a streaming media data obtaining address corresponding to the target streaming media parameter indicator.

In a possible design, the transceiver unit is further configured to:
  receive media manifest from the video server, where the media manifest includes the at least two streaming media parameter indicators; or
  obtain the at least two streaming media parameter indicators from the access network device.

In a possible design, when current buffer duration is less than or equal to a first threshold, the transceiver unit is configured to send the streaming media data obtaining request to the video server based on the target streaming media parameter indicator.

In a possible design, the transceiver unit is further configured to receive first network quality of service (QoS) information from a session management network element, where the first network QoS information includes the at least two streaming media parameter indicators and QoS rules corresponding to the at least two streaming media parameter indicators.

The processing unit is further configured to perform, according to a QoS rule corresponding to the target streaming media parameter indicator, QoS parameter configuration on a PDU session for streaming media data transmission.

According to a thirteenth aspect, an embodiment of this application provides a communication apparatus, specifically including a processor and a memory. The memory stores a computer program, and when the processor runs the computer program stored in the memory, the communication apparatus is enabled to perform the method in any one of the first aspect or the possible designs of the first aspect, or perform the method in any one of the second aspect or the possible designs of the second aspect, or perform the method in any one of the third aspect or the possible designs of the third aspect, or perform the method in any one of the fourth aspect or the possible designs of the fourth aspect, or perform the method in any one of the fifth aspect or the possible designs of the fifth aspect, or perform the method in any one of the sixth aspect or the possible designs of the sixth aspect.

According to a fourteenth aspect, an embodiment of this application provides a computer-readable storage medium, where the computer-readable storage medium stores a computer program. When the computer program is run on a computer, the computer is enabled to perform the method in any one of the first aspect or the possible designs of the first aspect, or perform the method in any one of the second aspect or the possible designs of the second aspect, or perform the method in any one of the third aspect or the possible designs of the third aspect, or perform the method in any one of the fourth aspect or the possible designs of the fourth aspect, or perform the method in any one of the fifth aspect or the possible designs of the fifth aspect, or perform the method in any one of the sixth aspect or the possible designs of the sixth aspect.

According to a fifteenth aspect, an embodiment of this application provides a computer program product. When the computer program product runs on a computer, the computer is enabled to perform the methods according to the foregoing aspects.

According to a sixteenth aspect, an embodiment of this application provides a communication system. The communication system includes the access network device in the first aspect, the policy control network element in the second aspect, and the session management network element in the third aspect.

In a possible design, the communication system may further include the user plane network element in the fourth aspect.

In a possible design, the communication system may further include the terminal in the fifth aspect and/or the terminal in the sixth aspect.

In addition, for technical effects of any possible design manner in the seventh aspect to the sixteenth aspect, refer to technical effects of different design manners in corresponding methods. Details are not described herein again.

BRIEF DESCRIPTION OF DRAWINGS

FIG. 4A and FIG. 4B each are a schematic flowchart of another network-based adaptive streaming media bit rate adjustment method according to an embodiment of this application;

DESCRIPTION OF EMBODIMENTS

Figure 1:
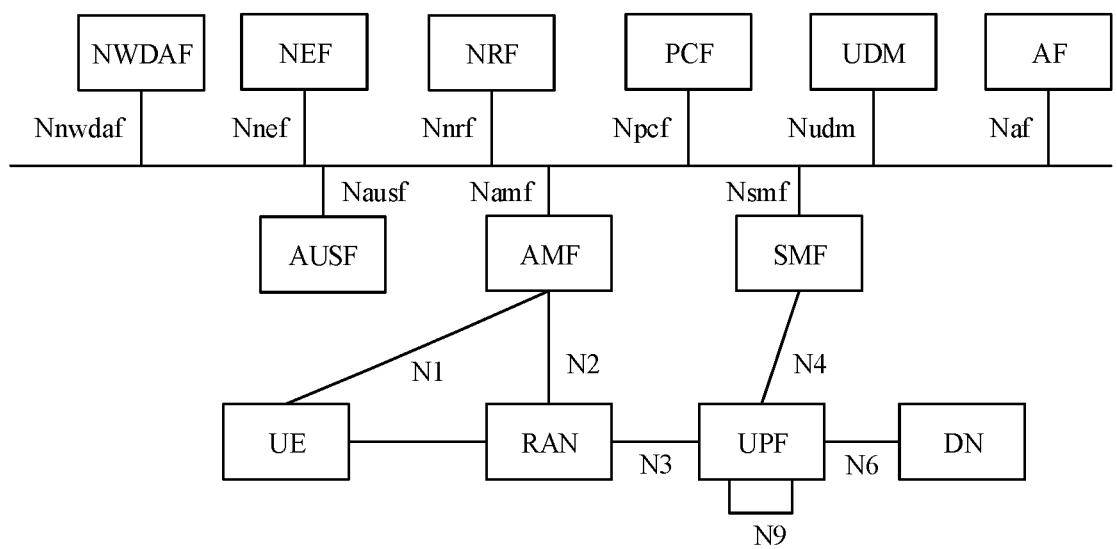
FIG. 1 is a schematic diagram of a network architecture to which an embodiment of this application is applicable.

It should be understood that, in embodiments of this application, "at least one" means one or more, and "a plurality of" means two or more. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent a, b, c, a and b, a and c, b and c, or a, b, and c, where each of a, b, and c may be an element, or may be a set including one or more elements.

In embodiments of this application, "example", "in some embodiments", "in another embodiment", and the like are used to represent an example, an illustration, or a description. Any embodiment or design scheme described as an "example" in this application should not be explained as being more preferred or having more advantages than another embodiment or design scheme. Exactly, the word "example" is used to present a concept in a specific manner.

In embodiments of this application, "of", "corresponding (relevant)", and "corresponding" may be interchangeably used sometimes. It should be noted that meanings expressed by the terms are consistent when differences are not emphasized. In embodiments of this application, communication and transmission may be interchangeably used sometimes. It should be noted that meanings expressed by the terms are consistent when differences are not emphasized. For example, transmission may include sending and/or receiving, and may be a noun or a verb.

It should be noted that, in embodiments of this application, terms such as "first" and "second" are only used for a purpose of distinction in description, but should not be understood as an indication or implication of relative importance or an indication or implication of a sequence. In embodiments of this application, "equal to" may be used together with "greater than", and this is applicable to a technical solution used when "greater than" is used; or "equal to" may be used together with "less than", and this is applicable to a technical solution used when "less than" is used. It should be noted that, when "equal to" is used together with "greater than", "equal to" is not used together with "less than", or when "equal to" is used together with "less than", "equal to" is not used together with "greater than".

A "network element" in embodiments of this application may also be referred to as a "device". This is not limited. The network element may be hardware or software obtained through functional division, or a structure of a combination thereof. The network element may include a core network element, an access network element (or referred to as an access network device), and the like. The core network element, for example, a session management network element or a user plane network element.

For the problem raised in the background, embodiments of this application provide a network-based adaptive streaming media bit rate adjustment method, where the access network device adjusts a bit rate of streaming media data based on a current network condition. Compared with a current technology, adjustment of the bit rate of streaming media data can adapt to changes of the network condition. Therefore, a user can watch a video with clearer image quality in real time on a terminal in the case of a good network condition, whereas streaming media data with a low bit rate is transmitted when the network condition deteriorates. This helps reduce a possibility of video freezing occurring when the user watches a video in real time on the terminal, to improve user experience.

The following provides description about some terms in embodiments of this application, to help a person skilled in the art have a better understanding.

1. Streaming media data Streaming media data in embodiments of this application may be understood as a segment of video stream, which may include one or more video frames. For example, a 45 minute video may be divided into a plurality of pieces of streaming media data with equal duration, where each piece of streaming media data corresponds to one or more bit rates. A bit rate for transmitting streaming media data by a video server to a terminal may be adjusted based on a network condition, or may be set by a user on a video client of the terminal.

2. Streaming media parameter: The streaming media parameter in embodiments of this application may indicate definition of image quality of a video frame. For example, the streaming media parameter may be a bit rate, a resolution, and/or a frame rate. For example, the bit rate depends on the resolution and the frame rate. For example, bit rate=frame rate*size of a video frame, where the size of the video frame depends on a resolution of the video frame and a media coding technology used. Therefore, there is usually a correspondence between a bit rate, a frame rate, and a resolution. For example, the streaming media parameter is a bit rate. After a bit rate is network-based adaptively adjusted, the frame rate and resolution are adjusted accordingly.

A higher bit rate indicates clearer video quality. For example, image quality of a video with a bit rate of 10 Mbps is clearer than that of a video with a bit rate of 5 Mbps. Generally, a higher bit rate indicates a higher requirement of streaming media data transmission on a network bandwidth. For example, a network bandwidth required for transmitting streaming media data at a bit rate of 10 Mbps is greater than a network bandwidth required for transmitting streaming media data at a bit rate of 5 Mbps.

It should be understood that, in embodiments of this application, the streaming media parameter is indicated by using a streaming media parameter indicator, and different streaming media parameters correspond to different streaming media parameter indicators. It should be noted that, when the streaming media parameter is a bit rate, the streaming media parameter indicator may also be referred to as a bit rate indicator. Similarly, when the streaming media parameter is a resolution, the streaming media parameter indicator may also be referred to as a resolution indicator. When the streaming media parameter is a frame rate, the streaming media parameter indicator may also be referred to as a frame rate indicator. For example, the streaming media parameter is a resolution. For example, a resolution indicator of 360P is 000, a resolution indicator of 720P is 001, and a resolution indicator of 1080P is 010.

It should be noted that, devices for performing a network-based adaptive streaming media parameter adjustment method on a network side in this application include the access network device, a mobility management network element, the session management network element, the user plane network element, and a policy control network element. The access network device is an access network element. The mobility management network element, the session management network element, the user plane network element, and the policy control network element are core network elements. For example, the access network device is configured to provide a wireless communication function for the terminal. For example, the access network device is a radio access network (RAN) element. The mobility management network element is responsible for mobility management of the terminal. For example, the mobility management network element is a mobility management entity (MME) or an access and mobility management function (AMF) entity. The session management network element is configured to control establishment, modification, and deletion of a packet data unit (PDU) session. For example, the session management network element is a session management function (SMF) entity. The user plane network element is responsible for connecting to an external network (for example, a data network (DN)). For example, the user plane network element is a user plane function (UPF) entity. The policy control network element is responsible for policy control, for example, generate a quality of service (QoS) parameter set. For example, the policy control network element is a policy control function (PCF) entity. Devices for performing a network-based adaptive streaming media bit rate adjustment method in this application include a terminal and a video server. It should be understood that, in embodiments of this application, the terminal may also be referred to as a terminal device, user equipment, a mobile terminal, a media client, or the like. This is not limited. The video server may also be referred to as a streaming media server or the like. This is not limited. The following describes embodiments of this application using UE and the video server as examples.

For example, FIG. 1 is a schematic diagram of a network architecture to which an embodiment of this application is applicable. The network architecture is a 5th generation mobile communication technology (the 5th generation mobile communication technology, 5G) network architecture. The network architecture includes a radio access network (RAN), an AMF entity, an SMF entity, a UPF entity, a PCF entity, a DN, and the like. In some embodiments, the network architecture further includes a unified data management function (unified data management, UDM) entity, an authentication server function (AUSF) entity, an application function (AF) entity, a network exposure function (NEF) entity, a network data analytics function (NWDAF) entity, and the like.

A main function of the RAN (which may also be referred to as an access network (AN)) is to control UE to wirelessly access a mobile communication network. The RAN is a part of a mobile communication system. The RAN implements a radio access technology. For example, the RAN controls, by using the RAN network element, UE to wirelessly access the mobile communication network, where the RAN is located between the UE and the core network element. The RAN network element, also referred to as an access network device, includes but is not limited to: a gNodeB (gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmitting and receiving point (TRP), a transmitting point (TP), a mobile switching center, and the like. In addition, the RAN device may further include a wireless fidelity (Wi-Fi) access point (AP) and the like.

The AMF entity is responsible for UE access management and mobility management, including user registration management, reachability detection, SMF entity selection, mobility state transition management, and the like.

The SMF entity is mainly responsible for controlling PDU session establishment, modification, and deletion, UPF entity selection, and the like.

The UPF entity is mainly responsible for data packet routing and forwarding, support of an anchor point for mobility, support of an uplink classifier to route traffic flows to a data network, support of branching point to support multi-homed PDU session, and the like.

The PCF entity is a policy decision point, and is mainly responsible for providing rules for service data flow and application detection, gating, and QoS, and rules for flow-based charging control.

The UDM entity is mainly responsible for storing user subscription data.

The AUSF entity is mainly configured to provide an authentication service.

The AF entity is mainly configured to interact with a 3rd generation partnership project (3GPP) core network to provide services, to support application influence on traffic routing, accessing network capability exposure, policy control, and the like.

The NEF entity is mainly configured to securely expose services and capabilities d provided by a 3GPP network function, for example, a third party, edge computing, or an AF.

The DN provides network services for UE, for example, operator services, internet access, or third-party services.

The NWDAF entity is mainly configured to provide functions of network data collection, analysis, and the like based on technologies such as big data and artificial intelligence.

In addition, for brevity of description, in subsequent descriptions, "entity" in each function entity is removed. For example, the AMF entity is referred to as an AMF for short, and the UPF entity is referred to as a UPF for short. Other entities are similar, which are not enumerated one by one.

In FIG. 1, any two network elements may communicate with each other in a service-based communication manner between the NWDAF, the NEF, the network repository function (NRF), the PCF, the UDM, the AF, the AUSF, the AMF, and the SMF. For example, both interfaces Nnef and Nausf for communication between the NEF and the AUSF are service-based interfaces. Similarly, interfaces Nnwdaf, Nnrf, Npcf, Nudm, Naf, Namf, and Nsmf are all service-based interfaces. In addition, the AMF may communicate with the UE through an N1 interface, the AMF may communicate with the RAN network element through an N2 interface, the RAN network element may communicate with the UPF through an N3 interface, the SMF may communicate with the UPF through an N4 interface, the UE communicates with the RAN network element through an air interface, the UPF may communicate with the DN through an N6 interface, and the UPFs communicate with each other through an N9 interface. It should be noted that service-based interfaces between network elements in FIG. 1 may alternatively be replaced with point-to-point interfaces.

In the network architecture shown in FIG. 1, network elements related to this application mainly include the RAN network element, the AMF entity, the SMF entity, the UPF entity, and the PCF entity.

It should be understood that the UE in this embodiment of this application is a device having a wireless transceiver function. The device may be deployed on land, and includes an indoor device, an outdoor device, a handheld device, or a vehicle-mounted device; or may be deployed on a water surface (for example, on a ship); or may be deployed in the air (for example, on an airplane, a balloon, or a satellite). For example, the UE may be a mobile phone, a tablet computer (pad), Vision, a computer having a wireless transceiver function, a virtual reality (VR) terminal device, an augmented reality (AR) terminal, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like.

It should be noted that FIG. 1 is merely an example of a network architecture to which an embodiment of this application is applicable, and does not constitute any limitation on embodiments of this application. Embodiments of this application may be alternatively applied to another network architecture, for example, a future mobile communication network architecture (for example, a 6G network architecture).

The network architecture shown in FIG. 1 and the streaming media parameter being a bit rate are used as an example to describe in detail the network-based adaptive streaming media parameter adjustment method in embodiments of this application. For a network-based adaptive streaming media parameter adjustment method in the case of the streaming media parameter being another parameter such as a resolution or a frame rate, refer to the network-based adaptive streaming media parameter adjustment method in the case of the streaming media parameter being the bit rate. Details are not described herein.

Example 1

Figure 2:
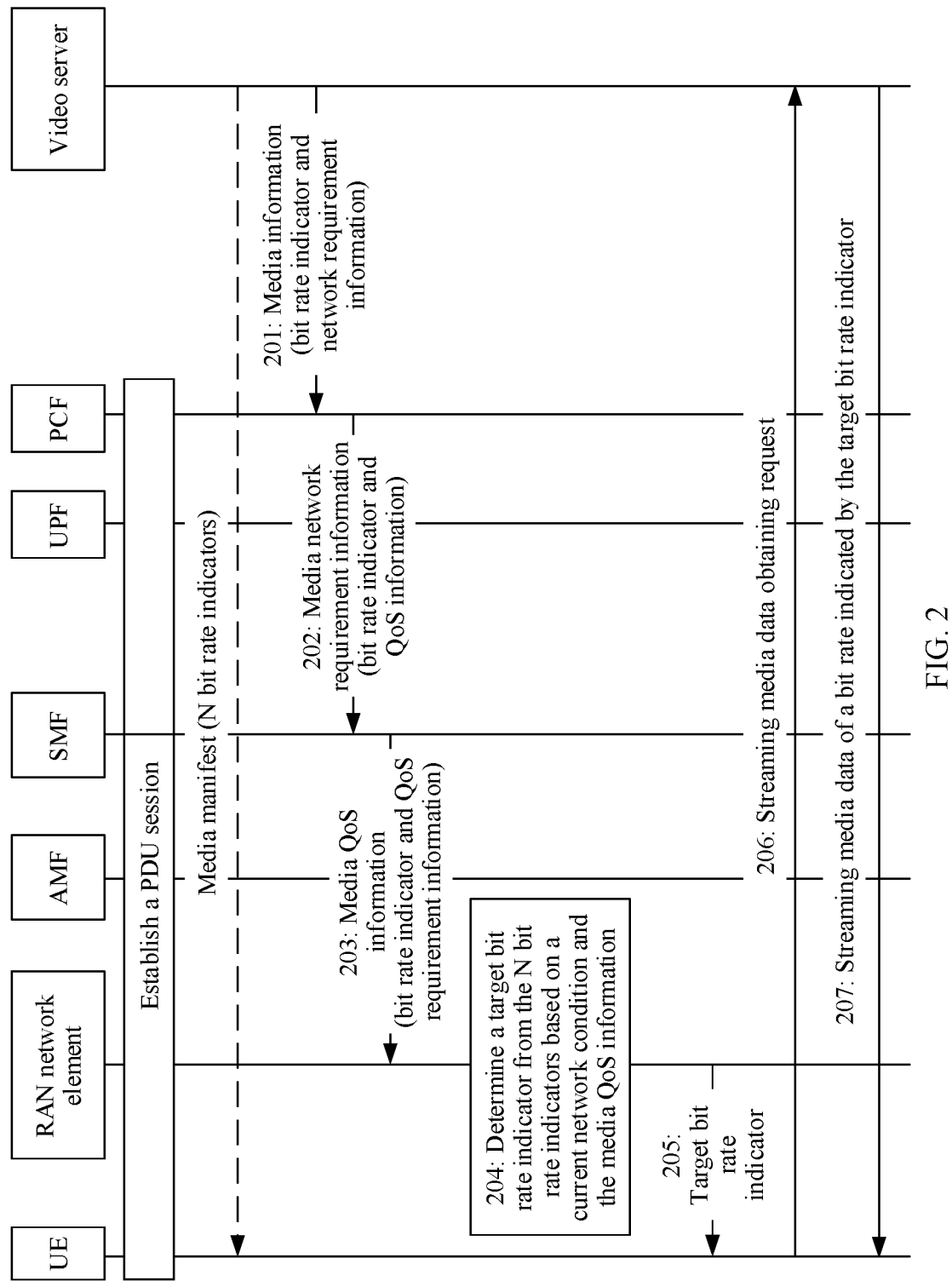
FIG. 2 is schematic flowchart of a network-based adaptive streaming media bit rate adjustment method according to an embodiment of this application.

FIG. 2 shows a network-based adaptive streaming media parameter adjustment method according to an embodiment of this application. The method specifically includes the following steps.

Step 201: A video server sends media information to a PCF. The media information includes N bit rate indicators and network requirement information for transmitting streaming media data at a bit rate indicated by each of the N bit rate indicators, where each of the N bit rate indicators indicates a bit rate supported by the video server, and N is a positive integer greater than or equal to 2.

For example, the bit rate indicator may be a bit rate index (which may also be referred to as a bit rate number). The bit rate indicator may be protocol-predefined, or may be generated by the video server. For example, bit rates supported by the video server are 10 Mbps, 5 Mbps, and 2 Mbps. The bit rates 10 Mbps, 5 Mbps, and 2 Mbps are respectively numbered to obtain bit rate indexes 00, 01, and 10, where the bit rate index 00 indicates the bit rate 10 Mbps, the bit rate index 01 indicates the bit rate 5 Mbps, and the bit rate index 10 indicates the bit rate 2 Mbps. For another example, the bit rate indicator may be a network bandwidth corresponding to the bit rate. For example, the network bandwidth corresponding to the bit rate indicator may be understood as a minimum network bandwidth required for transmitting streaming media data at a bit rate indicated by the bit rate indicator. For example, bit rates supported by the video server are 10 Mbps, 5 Mbps, and 2 Mbps. If a network bandwidth corresponding to 2 Mbps is A, a network bandwidth corresponding to 5 Mbps is B, and a network bandwidth corresponding to 10 Mbps is C, A indicates 2 Mbps, B indicates 5 Mbps, and C indicates 10 Mbps, meaning that bit rate indicators of 10 Mbps, 5 Mbps, and 2 Mbps are respectively C, B, and A. The foregoing is merely an example for describing the bit rate indicator. In this embodiment of this application, other information may alternatively be used to identify different bit rates. This is not limited.

In some embodiments, the video server sends the media information to the PCF via an AF. For example, the AF may send the media information to an NEF via an Nnef_AFsessionWithQoS_Create service, and the NEF performs authentication and then sends the media information to the PCF via an Npcf_PolicyAuthorization_Create service.

Further, in some embodiments, the media information may further include a media indicator. The media indicator indicates a streaming media service of a network-based adaptive bit rate, to indicate the PCF to send media requirement information to an SMF. For details, refer to related descriptions of step 202. Details are not described herein.

Network requirement information for transmitting streaming media data at a bit rate indicated by a bit rate indicator is used as an example. The network requirement information for transmitting the streaming media data at the bit rate indicated by the bit rate indicator may include information such as a transmission delay, a throughput, and a network bandwidth.

Step 202: After receiving the media information from the video server, the PCF sends media network requirement information to the SMF. The media network requirement information includes the N bit rate indicators and QoS information respectively corresponding to the N bit rate indicators, and QoS information corresponding to each of the N bit rate indicators indicates a network requirement for transmitting streaming media data at a bit rate indicated by a corresponding bit rate indicator.

For example, the QoS information corresponding to each of the N bit rate indicators may be obtained based on network requirement information for transmitting streaming media data at a bit rate indicated by the corresponding bit rate indicator. In this case, the QoS information may be a QoS parameter set. For example, N is 3. For example, the N bit rate indicators are number 1, number 2, and number 3, where a bit rate indicated by number 1 is 2 Mbps, a bit rate indicated by number 2 is 5 Mbps, and a bit rate indicated by number 3 is 10 Mbps. The PCF generates, based on network requirement information for transmitting streaming media data at 2 Mbps, a QoS parameter set corresponding to number 1; generates, based on network requirement information for transmitting streaming media data at 5 Mbps, a QoS parameter set corresponding to number 2; and generates, based on network requirement information for transmitting streaming media data at 10 Mbps, a QoS parameter set corresponding to number 3.

For another example, QoS information corresponding to each of the N bit rate indicators may be obtained based on network requirement information for transmitting streaming media data at a bit rate indicated by the corresponding bit rate indicator. For example, N is 3. For example, the N bit rate indicators are number 1, number 2, and number 3, where a bit rate indicated by number 1 is 2 Mbps, a bit rate indicated by number 2 is 5 Mbps, and a bit rate indicated by number 3 is 10 Mbps. If network requirement information for transmitting streaming media data at 2 Mbps, 5 Mbps, and 10 Mbps is respectively network requirement information 1, network requirement information 2, and network requirement information 3, QoS information corresponding to number 1 is the network requirement information 1, QoS information corresponding to number 2 is the network requirement information 2, and QoS information corresponding to number 3 is the network requirement information 3.

Further, when the media information includes a media indicator, the media network requirement information may further include the media indicator, to indicate the SMF to send media QoS information to a RAN network element. For details, refer to related descriptions of step 204. Details are not described herein.

For example, the PCF may send the media network requirement information via Npcf_SMPolicyControl_Update/Create to the SMF. For another example, the PCF may send the media network requirement information via newly defined information to the SMF.

Step 203: After receiving the media network requirement information from the PCF, the SMF sends the media QoS information to the RAN network element. The media QoS information includes the N bit rate indicators and QoS requirement information respectively corresponding to the N bit rate indicators.

For example, the QoS requirement information corresponding to each of the N bit rate indicators indicates a network requirement for transmitting streaming media data at a bit rate indicated by a corresponding bit rate indicator. For example, the QoS requirement information corresponding to each of the N bit rate indicators includes a QoS profile corresponding to the bit rate indicator. For example, the QoS requirement information corresponding to each of the N bit rate indicators is determined by the SMF based on QoS information corresponding to the bit rate indicator. For example, N is 3. For example, the N bit rate indicators are number 1, number 2, and number 3, where a bit rate indicated by number 1 is 2 Mbps, a bit rate indicated by number 2 is 5 Mbps, and a bit rate indicated by number 3 is 10 Mbps. The PCF determines, based on QoS information corresponding to number 1, QoS requirement information corresponding to number 1, determines, based on QoS information corresponding to number 2, QoS requirement information corresponding to number 2, and determines, based on QoS information corresponding to number 3, QoS requirement information corresponding to number 3. For example, the QoS requirement information corresponding to number 1 indicates a network requirement for transmitting streaming media data at 2 Mbps (for example, a minimum network bandwidth required for transmitting the streaming media data at 2 Mbps). The QoS requirement information corresponding to number 2 indicates a network requirement for transmitting streaming media data at 5 Mbps. The QoS requirement information corresponding to number 3 indicates a network requirement for transmitting streaming media data at 10 Mbps.

For example, the SMF may send the media QoS information to the RAN network element via an AMF. For example, the SMF may send, to the AMF, the media QoS information via an N2 SM Container included in Namf_Communication_N1N2MessageTransfer. Then, the AMF sends the N2 SM Container to the RAN network element using an N2 PDU Session service procedure.

Further, when the media network requirement information includes a media indicator, the media QoS information may include the media indicator, to indicate the RAN network element to determine a target bit rate indicator based on a current network condition. For details, refer to related descriptions of step 204. Details are not described herein.

Step 204: After receiving the media QoS information from the SMF, the RAN network element determines the target bit rate indicator from the N bit rate indicators based on the current network condition and the media QoS information. The current network condition meets a network requirement for transmitting streaming media data at a bit rate indicated by the target bit rate indicator.

In some embodiments, the RAN network element may determine the target bit rate indicator from the N bit rate indicators based on the current network condition and the media QoS information in the following manners.

The RAN network element monitors a network bandwidth.

When a difference, within a target range, between the network bandwidth detected by the RAN network element and a target network bandwidth lasts for target duration, the RAN network element determines, from the N bit rate indicators, that a bit rate indicator for indicating a bit rate of media data is the target bit rate indicator, where a network bandwidth required for transmitting the media data at the bit rate is the target network bandwidth.

For example, the RAN network element may monitor the network bandwidth in real time, or may periodically monitor the network bandwidth. A periodicity in which the RAN network element monitors the network bandwidth is less than the target duration. In this embodiment of this application, the target duration may also be referred to as a monitoring time window. The target duration may be predefined, or may be determined by the RAN network element based on buffer information. This is not limited. The buffer information indicates minimum buffer duration required for allowing video playing by the UE. It should be noted that, in a case in which the UE plays a video via a video client, the minimum buffer duration required for allowing video playing by the UE may be understood as: The minimum buffer duration required by the video client to allow video playing. For example, the buffer information indicates 3 seconds (s). The UE allows video playing only when the buffer duration of the streaming media data reaches 3 s. When the buffer duration of the streaming media data does not reach 3 s, the UE forbids playing the video, that is, the video is paused. Further, in some embodiments, the target duration is less than or equal to the minimum buffer duration required for allowing video playing by the UE, to facilitate the RAN network element to dynamically adjust, based on the detected network bandwidth, a bit rate of streaming media data transmitted between the video server and the UE. If the target duration is greater than the minimum buffer duration required for allowing video playing by the UE, the bit rate of streaming media data transmitted between the video server and the UE may not be adjusted in time. As a result, when a user watches a video online, frame freezing occurs during video playing, bringing poor user experience.

In some embodiments, the buffer information may be sent by the video server to the RAN network element, or may be obtained by the RAN network element from the UE. Further, when the buffer information is sent by the video server to the RAN network element, the video server may send the buffer information via the media information to the PCF, then the PCF sends the buffer information via the media network requirement information to the SMF, and the SMF sends the buffer information via the media QoS information to the RAN network element. This simplifies a manner in which the video server sends the buffer information to the RAN network element. It should be noted that the buffer information may be obtained from the UE through information exchange between the video server and the UE via application layer information, or may be preconfigured on the video server. This is not limited.

It should be noted that the target range may be a protocol-predefined error range, or may be an error range preconfigured in the video server, or the like. A manner of obtaining the target range is not limited in this embodiment of this application. For example, N is 3. For example, the N bit rate indicators are number 1, number 2, and number 3, where a bit rate indicated by number 1 is 2 Mbps, a bit rate indicated by number 2 is 5 Mbps, a bit rate indicated by number 3 is 10 Mbps, a network bandwidth required by streaming media data of 2 Mbps is 100 M, a network bandwidth required by streaming media data of 5 Mbps is 200 M, and a network bandwidth required by streaming media data of 10 Mbps is 300 M, and the target range is [−10 M, +10 M]. If the network bandwidth detected by the RAN network element is 199 M, a difference between the network bandwidth monitored by the RAN network element and the network bandwidth required by the streaming media data of 5 Mbps falls within the target range. When the difference, within the target range, between the network bandwidth detected by the RAN network element and the network bandwidth required by the streaming media data of 5 Mbps lasts for the target duration, the RAN network element determines number 2 as the target bit rate indicator. When the difference between the network bandwidth detected by the RAN network element and the network bandwidth required by the streaming media data of 10 Mbps lasts for the target duration in the target range, the RAN network element determines number 3 as the target bit rate indicator.

Step 205: The RAN network element sends the target bit rate indicator to the UE.

In some embodiments, the RAN network element may send, to the UE, the target bit rate indicator via a radio resource control (RRC) message or header information of a user plane downlink message.

For example, the RAN network element may send, to the UE, the target bit rate indicator via a packet data convergence protocol (PDCP) header of a user plane message.

It should be noted that the foregoing is merely example description of sending the target bit rate indicator to the UE by the RAN network element, and does not constitute any limitation on this embodiment of this application. In this embodiment of this application, the RAN network element may send the target bit rate indicator to the UE in another manner.

Step 206: The UE receives the target bit rate indicator from the video server, and sends a streaming media data obtaining request to the video server based on the target bit rate indicator, where the streaming media data obtaining request includes a streaming media data obtaining address corresponding to the target bit rate indicator. For example, the streaming media data obtaining address may be an internet protocol (IP) address.

In some embodiments, when current buffer duration is less than or equal to a first threshold, the UE sends the streaming media data obtaining request to the video server based on the target bit rate indicator. For example, the first threshold may be predefined, or may be determined by the UE depending on a specific scenario. This is not limited. For example, the first threshold may be 3 minutes, 5 minutes, or the like.

It should be noted that, when the UE plays the video via the video client, the current buffer duration is buffer duration of the video client currently.

For example, the video server may further send media manifest to the UE, where the media manifest includes the N bit rate indicators, and the N bit rate indicators herein are the same as the N bit rate indicators included in the foregoing media information, the media network requirement information, and the media QoS information. For example, the video server may send the media manifest to the UE via the application layer information, or may send the media manifest to the UE via a newly defined message, so that the UE can identify the target bit rate indicator. Alternatively, the UE may obtain the N bit rate indicators from the RAN network element. A manner in which the UE obtains the N bit rate indicators is not limited in this embodiment of this application.

It should be understood that names of the media information, the media network requirement information, the media QoS information, and the media manifest is not limited in this embodiment of this application.

Step 207: The video server receives the streaming media data obtaining request from the UE; obtains, from the streaming media data obtaining address corresponding to the target bit rate indicator, streaming media data at a bit rate indicated by the target bit rate indicator; and returns, to the UE, the streaming media data at the bit rate indicated by the target bit rate indicator.

For example, a user watches a 45-minutes video online via a video client of the UE. Each time current buffer duration of the video client is less than or equal to the first threshold, the video client sends the streaming media data obtaining request to the video server. The video server returns, each time in response to receiving a streaming media data obtaining request sent by the UE, duration of streaming media data to the UE is T. For example, at a moment T1, the UE receives the target bit rate indicator sent by the RAN network element. If the current buffer duration is greater than the first threshold, after playing the video until the current buffer duration is less than or equal to the first threshold, the UE sends the streaming media data obtaining request to the video server based on the target bit rate indicator. The video server returns, to the UE in response to the streaming media data obtaining request sent by the terminal based on the target bit rate indicator, the streaming media data indicated by the target bit rate indicator.

Example 2

Figure 3:
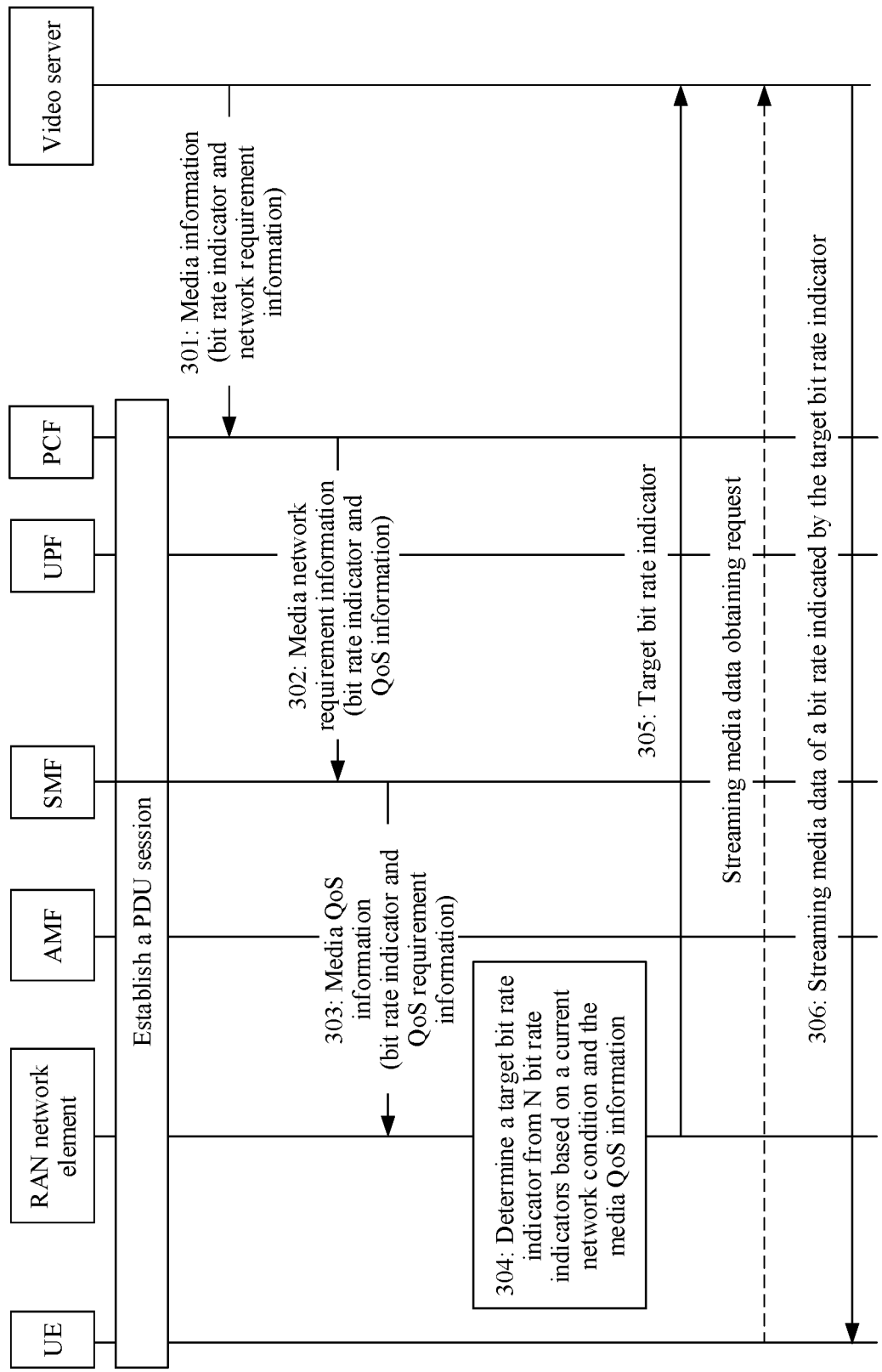
FIG. 3 is schematic flowchart of another network-based adaptive streaming media bit rate adjustment method according to an embodiment of this application.

FIG. 3 shows another network-based adaptive streaming media parameter adjustment method according to an embodiment of this application. The method specifically includes the following steps.

Step 301: A video server sends media information to a PCF. The media information includes N bit rate indicators and network requirement information for transmitting streaming media data at a bit rate indicated by each of the N bit rate indicators, where each of the N bit rate indicators indicates a bit rate supported by the video server, and N is a positive integer greater than or equal to 2.

Step 302: After receiving the media information from the video server, the PCF sends media network requirement information to an SMF. The media network requirement information includes the N bit rate indicators and QoS information respectively corresponding to the N bit rate indicators, and the QoS information corresponding to each of the N bit rate indicators indicates a network requirement for transmitting streaming media data at a bit rate indicated by a corresponding bit rate indicator.

Step 303: After receiving the media network requirement information from the PCF, the SMF sends media QoS information to a RAN network element. The media QoS information includes the N bit rate indicators and QoS requirement information respectively corresponding to the N bit rate indicators.

Step 304: After receiving the media QoS information from the SMF, the RAN network element determines a target bit rate indicator from the N bit rate indicators based on a current network condition and the media QoS information. The current network condition meets a network requirement for transmitting streaming media data at a bit rate indicated by the target bit rate indicator.

Step 305: The RAN network element sends the target bit rate indicator to the video server.

In some embodiments, the RAN network element may send the target bit rate indicator via control plane signaling or header information of a user plane downlink message to the video server.

For example, the RAN network element may send the target bit rate to the SMF by interacting with the SMF using control plane signaling, the SMF sends the target bit rate indicator to the PCF, then the PCF sends the target bit rate indicator to an AF via a capability exposure service, and finally, the AF sends the target bit rate indicator to the video server.

For another example, the RAN network element may send the target bit rate indicator via the GPRS tunneling protocol for the user plane (GTP-U) of the user plane message to the UPF, and then the UPF sends the target bit rate indicator via an internet protocol (IP) header of the user plane message to the video server. It should be noted that GTP-U in this embodiment of this application may also be referred to as GTP for short.

It should be noted that the foregoing is merely example description of sending the target bit rate indicator to the video server by the RAN network element, and does not constitute any limitation on this embodiment of this application. In this embodiment of this application, the RAN network element may send the target bit rate indicator to the video server in another manner.

Step 306: The video server receives the target bit rate indicator from the RAN network element, and sends, to the UE, the streaming media data at the bit rate indicated by the target bit rate indicator.

For example, after receiving the target bit rate indicator sent by the RAN network element, the video server sends, to the UE in response to receiving a streaming media data obtaining request from the UE, the streaming media data at the bit rate indicated by the target bit rate indicator.

For example, when current buffer duration is less than or equal to a first threshold, the UE may send the streaming media data obtaining request to the video server based on the target bit rate indicator.

It should be noted that, for step 301 to step 304 in Example 2, refer to related descriptions of step 201 to step 204 in Example 1. Details are not described herein again. Different from Example 1, in Example 2, the RAN network element may directly send the target bit rate indicator to the video server without improvement of the UE.

The network-based adaptive streaming media bit rate adjustment method in Example 1 and Example 2 may be applied to a maximum bit rate (MBR) service scenario. For a guaranteed bit rate (GBR) service scenario, if a bit rate of streaming media data transmitted between the video server and the UE adapted to a network bandwidth detected by the RAN network element is adjusted, QoS parameter configuration further needs to be performed on a PDU session for streaming media data transmission, so that the PDU session can meet a transmission requirement of the streaming media data transmitted between the video server and the UE after the adjustment of the bit rate. A connection between the UE and the video server may be established using the PDU session, to implement streaming media data transmission between the UE and the video server. For example, refer to related descriptions in Example 3 and Example 4.

Example 3

Figure 4B:
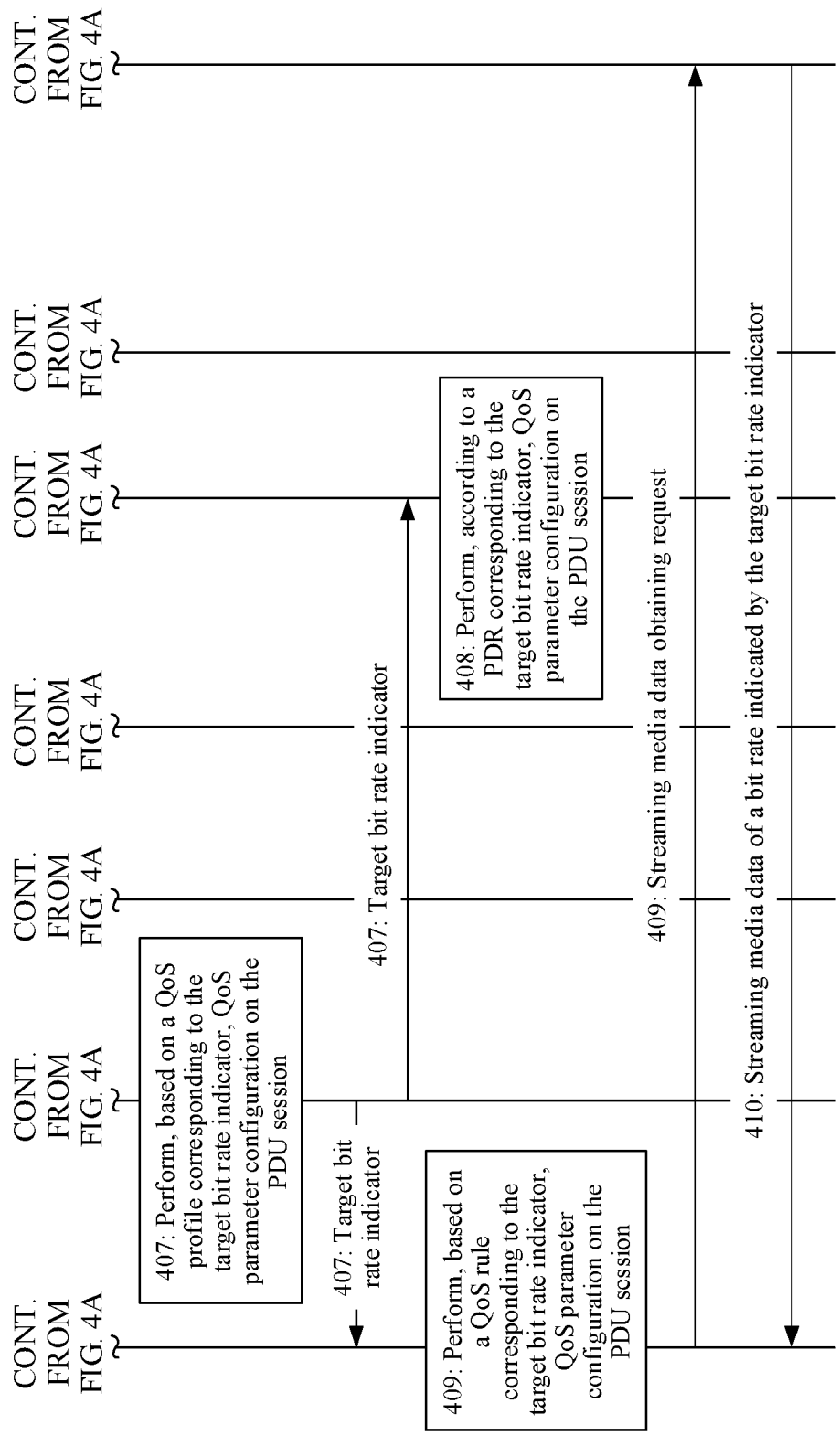

FIG. 4A and FIG. 4B show a network-based adaptive streaming media parameter adjustment method according to an embodiment of this application. The method specifically includes the following steps.

Step 401: A video server sends media information to a PCF. The media information includes N bit rate indicators and network requirement information for transmitting streaming media data at a bit rate indicated by each of the N bit rate indicators, where each of the N bit rate indicators indicates a bit rate supported by the video server, and N is a positive integer greater than or equal to 2.

Step 402: After receiving the media information from the video server, the PCF sends media network requirement information to an SMF. The media network requirement information includes the N bit rate indicators and QoS information respectively corresponding to the N bit rate indicators, and the QoS information corresponding to each of the N bit rate indicators indicates a network requirement for transmitting streaming media data at a bit rate indicated by a corresponding bit rate indicator.

After receiving the media network requirement information from the PCF, the SMF performs step 403a, step 403b, and step 403c. A sequence of performing step 403a, step 403b, and step 403c is not limited. For example, step 403a, step 403b, and step 403c may be performed at the same time, or may not be performed at the same time. This is not limited.

Step 403a: The SMF sends media QoS information to a RAN network element. The media QoS information includes the N bit rate indicators and QoS requirement information corresponding to each of the N bit rate indicators, and the QoS requirement information corresponding to each of the N bit rate indicators includes a QoS profile corresponding to the bit rate indicator.

Step 403b: The SMF sends first network QoS information to UE, where the first network QoS information includes the N bit rate indicators and a QoS rule corresponding to each of the N bit rate indicators.

Step 403c: The SMF sends second network QoS information to a UPF, where the second network QoS information includes the N bit rate indicators and a packet detection rule (PDR) corresponding to each of the N bit rate indicators.

The QoS profile, the QoS rule, and the PDR correspond to each of the N bit rate indicators are determined by the SMF based on the media network requirement information from the PCF.

For example, N is 3. For example, N bit rate indexes are number 1, number 2, and number 3, where a bit rate indicated by number 1 is 2 Mbps, a bit rate indicated by number 2 is 5 Mbps, and a bit rate indicated by number 3 is 10 Mbps. QoS information corresponding to number 1 is a QoS parameter set 1, QoS information corresponding to number 2 is a QoS parameter set 2, and QoS information corresponding to number 3 is a QoS parameter set 3. The PCF determines, based on the QoS parameter set 1, a QoS profile, a QoS rule, and a PDR that correspond to number 1; determines, based on the QoS parameter set 2, a QoS profile, a QoS rule, and a PDR that correspond to number 2; and determines, based on the QoS parameter set 3, a QoS profile, a QoS rule, and a PDR that correspond to number 3.

For example, the SMF may send media QoS information to the RAN network element via an AMF, and send the first network QoS information to the UE via the AMF. For example, the SMF may send, to the AMF, the media QoS information via an N2 SM Container included in Namf_Communication_N1N2MessageTransfer, and the first network QoS information via an N1 SM Container included in Namf_Communication_N1N2MessageTransfer. Then, the AMF sends the N1 SM Container and the N2 SM Container to the RAN network element using an N2 PDU Session service procedure. After receiving the N1 SM Container, the RAN network element sends the N1 SM Container to the UE, so that the UE receives the first network QoS information from the SMF.

For example, the SMF may send the second network QoS information to the UPF using an N4 session modification procedure.

Step 404: After receiving the second network QoS information, the UPF stores the N bit rate indicators and a PDR corresponding to each of the N bit rate indicators.

Step 405: After receiving the first network QoS information, the UE stores the N bit rate indicators and a QoS rule corresponding to each of the N bit rate indicators.

Step 406: After receiving the media QoS information from the SMF, the RAN network element determines a target bit rate indicator from the N bit rate indicators based on a current network condition and the media QoS information. The current network condition meets a network requirement for transmitting streaming media data at a bit rate indicated by the target bit rate indicator.

Step 407: The RAN network element performs, based on a QoS profile corresponding to the target bit rate indicator in QoS profiles respectively corresponding to the N bit rate indicators, QoS parameter configuration on the PDU session for streaming media data transmission; and the RAN network element sends the target bit rate indicator to a terminal and the UPF.

That the RAN network element performs, based on a QoS profile corresponding to the target bit rate indicator, QoS parameter configuration on the PDU session for streaming media data transmission may be understood as follows: The RAN network element performs, based on the QoS profile corresponding to the target bit rate indicator, RAN-side QoS parameter configuration on the PDU session for streaming media data transmission.

For example, the RAN network element may send the target bit rate indicator to the UPF in the following manner.

The RAN network element may send the target bit rate indicator to the UPF via the SMF. For example, the RAN network element sends the target bit rate indicator to the SMF by interacting with the SMF using control plane signaling, and then the SMF sends the target bit rate indicator to the UPF using an N4 session modification procedure. For another example, the RAN network element sends the target bit rate indicator via a GTP header of a user plane message to the UPF.

Step 408: The UPF receives the target bit rate indicator from the RAN network element; and performs, according to a PDR corresponding to the target bit rate indicator in the PDRs corresponding to the N bit rate indicators, QoS parameter configuration on a PDU session for streaming media data transmission.

That the UPF performs, according to the PDR corresponding to the target bit rate indicator, QoS parameter configuration on the PDU session for streaming media data transmission may be understood as follows: The UPF performs, according to the PDR corresponding to the target bit rate indicator, UPF-side QoS parameter configuration on the PDU session for streaming media data transmission.

Step 409: The UE receives the target bit rate indicator from the RAN network element; performs, according to a QoS rule corresponding to the target bit rate indicator in QoS rules respectively corresponding to the N bit rate indicators, QoS parameter configuration on the PDU session for streaming media data transmission; and sends a streaming media data obtaining request to the video server based on the target bit rate indicator.

That the UE performs, according to the QoS rule corresponding to the target bit rate indicator, QoS parameter configuration on the PDU session for streaming media data transmission may be understood as follows: The UE performs, according to the QoS rule corresponding to the target bit rate indicator, UE-side QoS parameter configuration on the PDU session for streaming media data transmission.

Step 410: The video server receives the streaming media data obtaining request from the UE, and returns streaming media data at a bit rate indicated by the target bit rate indicator to the UE.

It should be noted that, for same steps in Example 3 and Example 1, refer to related descriptions in Example 1. Details are not described herein again.

Example 4

Figure 5A:
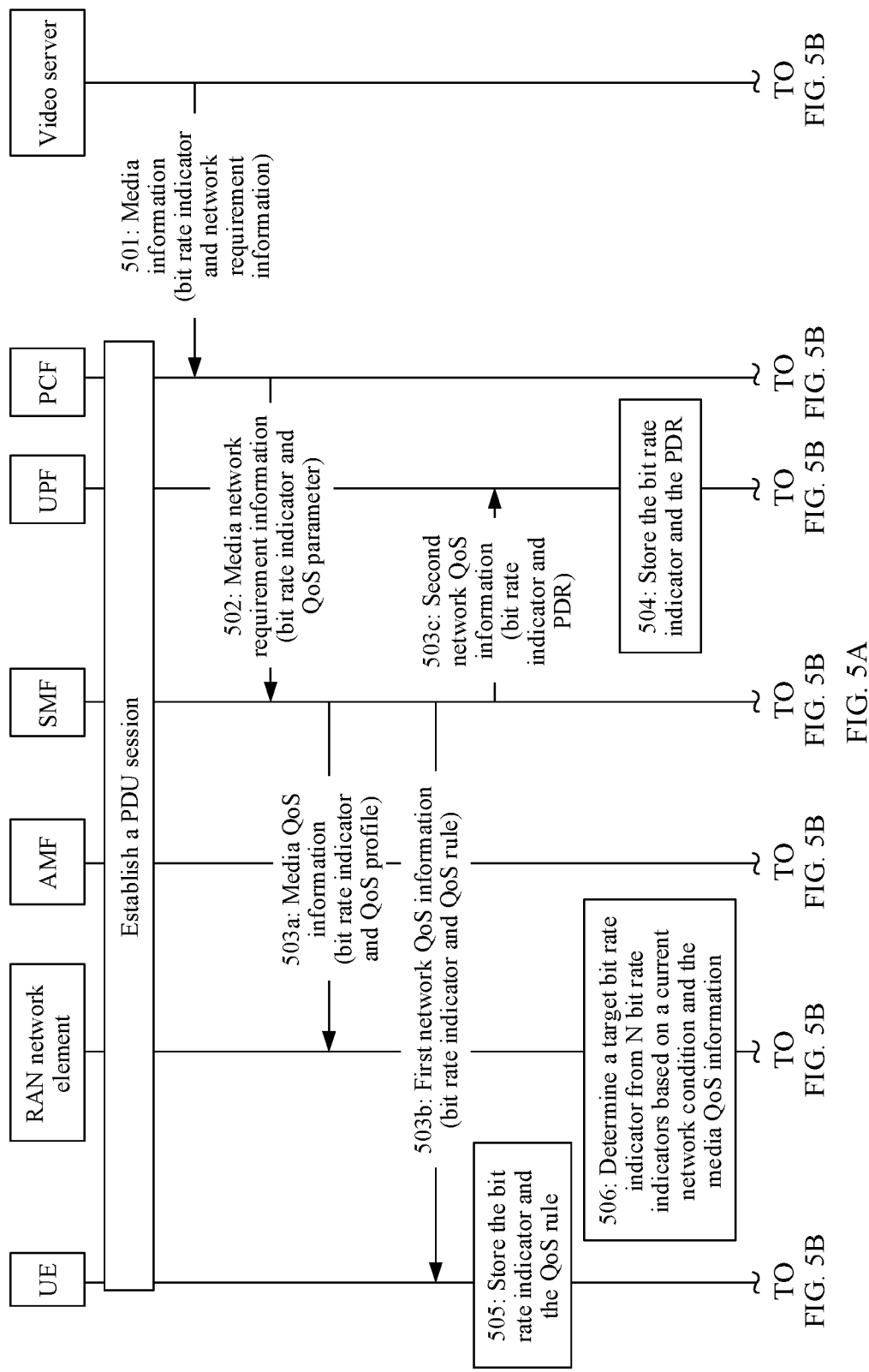
FIG. 5A and FIG. 5B each are a schematic flowchart of another network-based adaptive streaming media bit rate adjustment method according to an embodiment of this application.
Figure 5B:
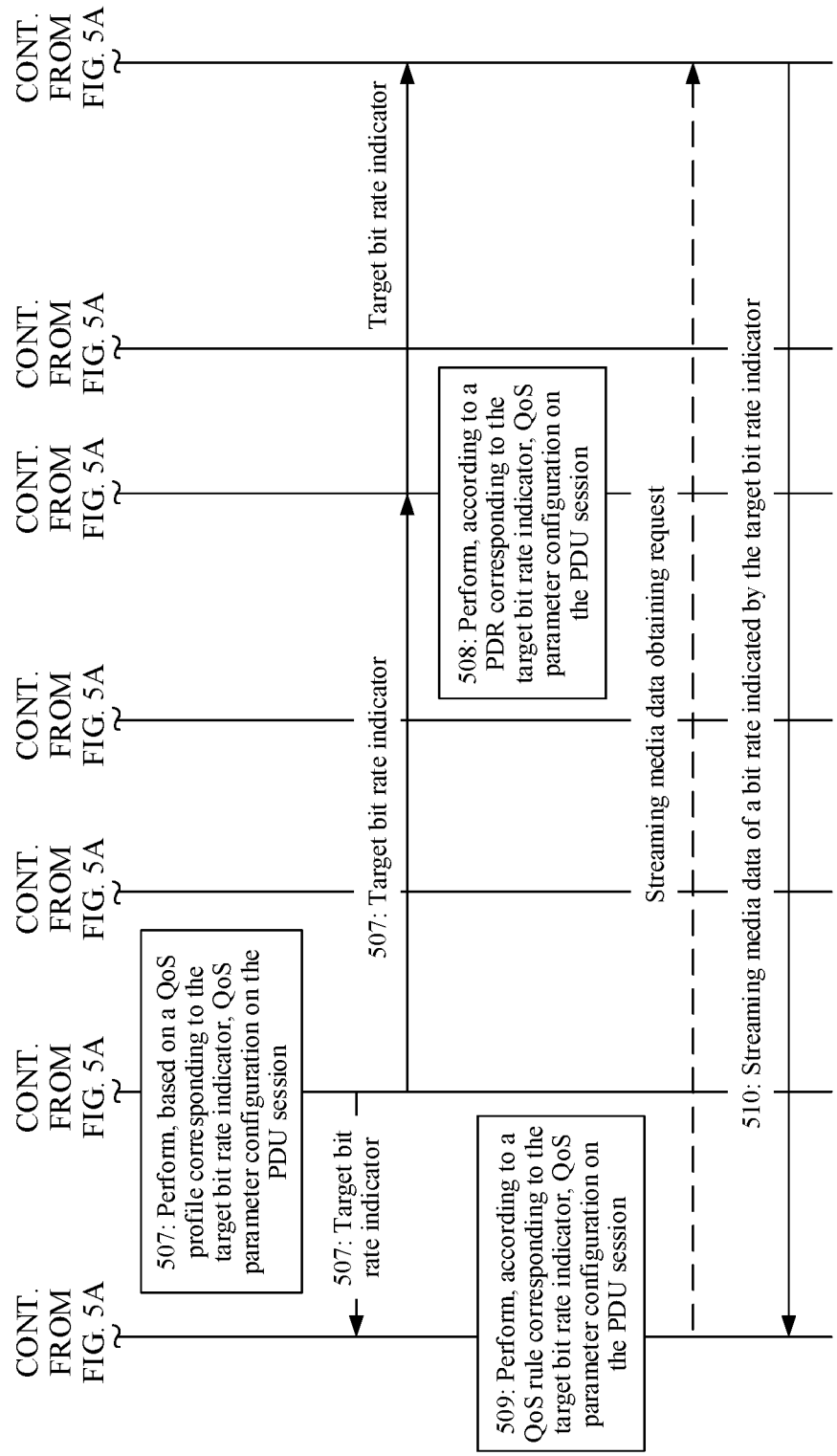

FIG. 5A and FIG. 5B show a network-based adaptive streaming media parameter adjustment method according to an embodiment of this application. The method specifically includes the following steps.

Step 501: A video server sends media information to a PCF. The media information includes N bit rate indicators and network requirement information for transmitting streaming media data at a bit rate indicated by each of the N bit rate indicators, where each of the N bit rate indicators indicates a bit rate supported by the video server, and N is a positive integer greater than or equal to 2.

Step 502: After receiving the media information from the video server, the PCF sends media network requirement information to an SMF. The media network requirement information includes the N bit rate indicators and QoS information respectively corresponding to the N bit rate indicators, and the QoS information corresponding to each of the N bit rate indicators indicates a network requirement for transmitting streaming media data at a bit rate indicated by a corresponding bit rate indicator.

After receiving the media network requirement information from the PCF, the SMF performs step 503*a*, step 503*b*, and step 503*c*. A sequence of performing step 503*a*, step 503*b*, and step 503*c* is not limited. For example, step 503*a*, step 503*b*, and step 503*c* may be performed at the same time, or may not be performed at the same time. This is not limited.

Step 503*a*: The SMF sends media QoS information to the RAN network element, where the media QoS information includes the N bit rate indicators and QoS requirement information corresponding to each of the N bit rate indicators, and the QoS requirement information corresponding to each of the N bit rate indicators includes a QoS profile corresponding to the bit rate indicator.

Step 503*b*: The SMF sends first network QoS information to UE, where the first network QoS information includes the N bit rate indicators and a QoS rule corresponding to each of the N bit rate indicators.

Step 503*c*: The SMF sends second network QoS information to a UPF, where the second network QoS information includes the N bit rate indicators and a PDR corresponding to each of the N bit rate indicators.

Step 504: After receiving the second network QoS information, the UPF stores the N bit rate indicators and the PDR corresponding to each of the N bit rate indicators.

Step 505: After receiving the first network QoS information, the UE stores the N bit rate indicators and the QoS rule corresponding to each of the N bit rate indicators.

Step 506: After receiving the media QoS information from the SMF, the RAN network element determines a target bit rate indicator from the N bit rate indicators based on a current network condition and the media QoS information. The current network condition meets a network requirement for transmitting streaming media data at a bit rate indicated by the target bit rate indicator.

Step 507: The RAN network element performs, based on a QoS profile corresponding to the target bit rate indicator in QoS profiles respectively corresponding to the N bit rate indicators, QoS parameter configuration on the PDU session for streaming media data transmission; and sends the target bit rate indicator to a terminal, the video server and the UPF.

For example, the RAN network element may send the target bit rate indicator to the video server via the UPF. For example, the UPF may send the target bit rate to the SMF by interacting with the SMF using control plane signaling, the SMF sends the target bit rate indicator to an AF via the PCF, and the AF sends the target bit rate indicator to the video server. For another example, the UPF may send the target bit rate indicator via a GTP header of a user plane downlink message to the video server.

Step 508: The UPF receives the target bit rate indicator from the RAN network element; and performs, according to a PDR corresponding to the target bit rate indicator in the PDRs respectively corresponding to the N bit rate indicators, QoS parameter configuration on the PDU session for streaming media data transmission.

Step 509: The UE receives the target bit rate indicator from the RAN network element; and performs, based on a QoS rule corresponding to the target bit rate indicator in the QoS rules respectively corresponding to the N bit rate indicators, QoS parameter configuration on the PDU session for streaming media data transmission.

Step 510: The video server receives the target bit rate indicator, and sends, to the UE, the streaming media data at the bit rate indicated by the target bit rate indicator.

For example, after receiving the target bit rate indicator, the video server sends, to the UE in response to receiving the streaming media data obtaining request from the UE, the streaming media data at the bit rate indicated by the target bit rate indicator.

For example, when current buffer duration is less than or equal to a first threshold, the UE may send the streaming media data obtaining request to the video server based on the target bit rate indicator.

For related understanding of performing, by the RAN network element, the UPF, and the UE, QoS parameter configuration on the PDU session for streaming media data transmission, refer to Example 3. Details are not described herein again.

It should be noted that, for same steps in Example 4 and Example 3, refer to Example 3. Details are not described herein again.

In addition, it should be further noted that, for Example 1 to Example 4, the UE may report the current buffer duration or other information to the RAN network element, so that the RAN network element may determine, with reference to information such as the current buffer duration of the video client reported by the UE, a policy for monitoring the network bandwidth, and streaming media data of a bit rate indicated by the bit rate indicator better adapts to transmission in a current network condition, where the streaming media data is indicated by the RAN network element the UE or the video server.

It should be understood that the foregoing embodiments may be used separately, or may be used in combination for different technical effects.

Based on the foregoing embodiments, an embodiment of this application provides a network-based adaptive streaming media bit rate adjustment method. For example, an access network device receives media QoS information from a session management network element, determines a target bit rate indicator from at least two bit rate indicators based on a current network condition and the media QoS information, and then sends the target bit rate indicator in the at least two bit rate indicators to a terminal or a video server. The media QoS information includes the at least two bit rate indicators and QoS requirement information corresponding to each of the at least two bit rate indicators, each of the bit rate indicators indicates a bit rate supported by the video server, and the current network condition meets a network requirement for transmitting streaming media data at a bit rate indicated by the target bit rate indicator.

For example, for sending the media QoS information to the access network device by the session management network element, refer to related descriptions of step 203, step 303, step 403, or step 503. For determining the target bit rate indicator from the at least two bit rate indicators based on the current network condition and the QoS information by the access network device, refer to related descriptions of step 204, step 304, step 406, or step 506. For sending the target bit rate indicator to the terminal by the access network device, refer to related descriptions of step 205, step 407, or step 507. For sending the target bit rate indicator to the video server by the access network device, refer to related descriptions of step 305, step 407, or step 507. Details are not described herein again.

In some embodiments, the QoS requirement information corresponding to each of the bit rate indicators includes a QoS profile corresponding to each of the bit rate indicators. Further, in some embodiments, the access network device performs, based on the QoS profile corresponding to the target bit rate indicator, QoS parameter configuration on a PDU session for streaming media data transmission; and sends the target bit rate indicator to a user plane network element.

For example, for performing QoS parameter configuration on the PDU session for streaming media data transmission by the access network device based on the QoS profile corresponding to the target bit rate indicator, and sending the target bit rate indicator to the user plane network element by the access network device, refer to related descriptions of step 407 or step 507. Details are not described herein again.

For example, a policy control network element receives media information from the video server, and sends media network requirement information to the session management network element, where the media information includes the at least two bit rate indicators and network requirement information for transmitting streaming media data at a bit rate indicated by each of the at least two bit rate indicators, and each of the bit rate indicators indicates a bit rate supported by the video server. The media network requirement information includes the at least two bit rate indicators and QoS information corresponding to each of the at least two bit rate indicators, and the QoS information corresponding to each of the bit rate indicators indicates a network requirement for transmitting streaming media data at a bit rate indicated by a corresponding bit rate indicator.

For example, for sending the media information by the video server to the policy control network element, refer to related descriptions of step 201, step 301, step 401, or step 501. For sending the media network requirement information by the policy control network element to the session management network element, refer to related descriptions of step 202, step 302, step 402, or step 502. Details are not described herein again.

For example, the session management network element receives the media network requirement information sent by the policy control network element, and sends the media QoS information to the access network device.

Further, in some embodiments, the session management network element further sends first network QoS information to a terminal, and sends second network QoS information to the user plane network element, where the first network QoS information includes the at least two bit rate indicators and a QoS rule corresponding to each of the at least two bit rate indicators, and the second network QoS information includes the at least two bit rate indicators and a PDR corresponding to each of the at least two bit rate indicators.

For example, for sending the first network QoS information to the terminal and sending the second network QoS information to the user plane network element by the session management network element, refer to related descriptions of step 403 or step 503. Details are not described herein again.

In some embodiments, the user plane network element receives the second network QoS information; and after receiving the target bit rate indicator, the user plane network element performs, according to a PDR corresponding to the target bit rate indicator, QoS parameter configuration on the PDU session for streaming media data transmission.

In some embodiments, the video server sends media manifest to the terminal, where the media manifest includes the at least two bit rate indicators. Alternatively, in some embodiments, the terminal may obtain the at least two bit rate indicators from the access network device. For obtaining the at least two bit rate indicators by the terminal, refer to related descriptions in Example 1. Details are not described herein again.

In some embodiments, for description about that the video server sends, to the terminal after receiving the target bit rate indicator, the streaming media data at the bit rate indicated by the target bit rate indicator, refer to step 306 or step 510. Details are not described herein again.

In some other embodiments, the terminal receives the target bit rate indicator from the access network device, and sends the streaming media data obtaining request to the video server based on the target bit rate indicator. The streaming media data obtaining request includes a streaming media data obtaining address corresponding to the target bit rate indicator. For this step, refer to related descriptions of step 206 or step 409. Details are not described herein again.

Further, in some embodiments, the terminal further receives first network quality of service (QoS) information from the session management network element, and performs, according to a QoS rule corresponding to a standard bit rate indicator, QoS parameter configuration on a protocol data unit (PDU) session for streaming media data transmission.

In the foregoing embodiments provided in this application, the communication method provided in embodiments of this application is described from the perspective of a terminal device used as an execution body. To implement functions in the communication method provided in embodiments of this application, a terminal device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 6:
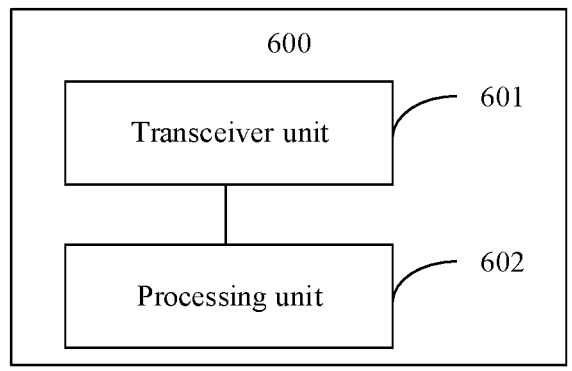
FIG. 6 is a schematic diagram of a structure of a communication apparatus according to an embodiment of this application.

For example, FIG. 6 shows a communication apparatus 600 according to an embodiment of this application. The communication apparatus 600 includes a transceiver unit 601 and a processing unit 602.

In an example, the communication apparatus 600 is configured to implement functions of the RAN network element in the methods shown in FIG. 2 to FIG. 5A and FIG. 5B. In this case, the transceiver unit 601 is configured to receive media QoS information from a session management network element. The media QoS information includes N bit rate indicators and QoS requirement information corresponding to each of the N bit rate indicators, where each of the bit rate indicators indicates a bit rate supported by a video server, and N is a positive integer greater than or equal to 2.

The processing unit 602 is configured to determine a target bit rate indicator from the N bit rate indicators based on a current network condition and the media QoS information, where the current network condition meets a network requirement for transmitting streaming media data at a bit rate indicated by the target bit rate indicator.

The transceiver unit 601 is further configured to send the target bit rate indicator to a terminal or the video server.

In another example, the communication apparatus 600 is configured to implement functions of the UPF in the methods shown in FIG. 2 to FIG. 5A and FIG. 5B. In this case, the transceiver unit 601 is configured to receive second network QoS information from the session management network element, where the second network QoS information includes the N bit rate indicators, and a PDR corresponding to each of the N bit rate indicators; and receive a target bit rate indicator sent by an access network device, where the target bit rate indicator is one of the N bit rate indicators, and the current network condition meets a network requirement for transmitting streaming media data indicated by the target bit rate indicator.

The processing unit 602 is configured to perform, according to a PDR corresponding to the target bit rate indicator in the PDRs corresponding to the N bit rate indicators, QoS parameter configuration on a PDU session for streaming media data transmission.

In another example, the communication apparatus 600 is configured to implement functions of the video server in the methods shown in FIG. 2 to FIG. 5A and FIG. 5B. In this case, the processing unit 602 is configured to generate media information, where the media information includes the N bit rate indicators and network requirement information for transmitting streaming media data at a bit rate indicated by each of the N bit rate indicators.

The transceiver unit 601 is configured to send the media information to a policy control network element.

In another example, the communication apparatus 600 is configured to implement functions of the UE in the methods shown in FIG. 2 to FIG. 5A and FIG. 5B. In this case, the transceiver unit 601 is configured to receive a target bit rate indicator from the access network device, and the current network condition meets a network requirement for transmitting streaming media data indicated by the target bit rate indicator.

The processing unit 602 is configured to send a streaming media data obtaining request to the video server based on the target bit rate indicator.

Figure 7:
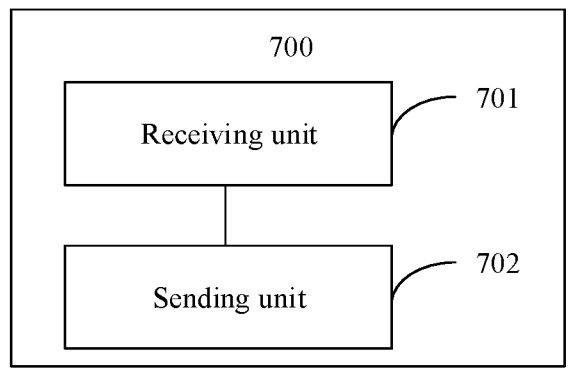
FIG. 7 is a schematic diagram of a structure of another communication apparatus according to an embodiment of this application.

For example, FIG. 7 shows a communication apparatus 700 according to an embodiment of this application. The communication apparatus 700 includes a receiving unit 701 and a sending unit 702.

In an example, the communication apparatus 700 is configured to implement functions of the PCF in the methods shown in FIG. 2 to FIG. 5A and FIG. 5B. In this case, the receiving unit 701 is configured to receive media information from a video server, where the media information includes N bit rate indicators and network requirement information for transmitting streaming media data at a bit rate indicated by each of the N bit rate indicators.

The sending unit 702 is configured to send media network requirement information to a session management network element, where the media network requirement information includes the N bit rate indicators, and QoS information corresponding to each of the N bit rate indicators.

In an example, the communication apparatus 700 is configured to implement functions of the SMF in the methods shown in FIG. 2 to FIG. 5A and FIG. 5B. In this case, the receiving unit 701 is configured to receive media network requirement information from a policy control network element.

The sending unit 702 is configured to send media QoS information to an access network device, where the media QoS information includes the N bit rate indicators and QoS requirement information corresponding to the N bit rate indicators.

Figure 8:
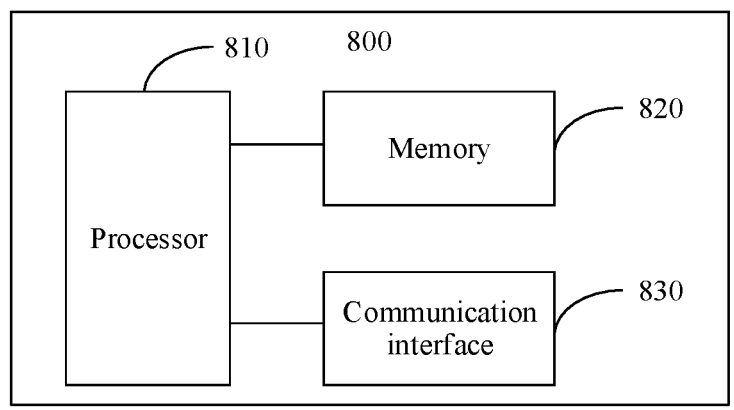
FIG. 8 is a schematic diagram of a structure of another communication apparatus according to an embodiment of this application.

For example, FIG. 8 shows a communication apparatus 800 according to an embodiment of this application. The communication apparatus 800 includes at least one processor 810 and a memory 820, and may be configured to implement functions of the RAN network element, the PCF, the UPF, the SMF, the UE, or the video server in the methods shown in FIG. 2 to FIG. 5A and FIG. 5B.

The memory 820 stores a computer program. The memory 820 is coupled to the processor 810. Coupling in this embodiment of this application is indirect coupling or a communication connection between apparatuses, units, or modules, may be implemented in electronic, mechanical, or other forms, and are used for information exchange between the apparatuses, the units, or the modules. In another implementation, the memory 820 may alternatively be located outside the communication apparatus 800. The processor 810 may collaborate with the memory 820. The processor 810 may invoke the computer program stored in the memory 820, to implement the network-based adaptive streaming media bit rate adjustment method provided in the foregoing embodiment. At least one of the at least one memory may be included in the processor.

In some embodiments, the communication apparatus 800 may further include a communication interface 830 for communicating with another device through a transmission medium, to allow an apparatus in the communication apparatus 800 to communicate with the another device. For example, the communication interface 830 may be a transceiver, a circuit, a bus, a module, or another type of communication interface. The another device may be another terminal. The processor 810 receives and sends data through the communication interface 830, and is configured to implement the methods in the foregoing embodiments.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the method disclosed with reference to embodiments of this application may be directly performed and completed by a hardware processor, or may be performed and completed by using a combination of hardware and software modules in the processor.

In embodiments of this application, the memory may be a nonvolatile memory, for example, a hard disk drive (HDD) or a solid-state drive (SSD), or may be a volatile memory such as a random access memory (RAM). The memory is any other medium that can carry or store expected program code in a form of instructions or a data structure and can be accessed by a computer, but is not limited thereto. The memory in embodiments of this application may alternatively be a circuit or any other apparatus that can implement a storage function, and is configured to store the computer program, and/or the data.

All or some of the methods in embodiments of this application may be implemented by using software, hardware, firmware, or any combination thereof. When software is used to implement embodiments, all or some of the embodiments may be implemented in a form of a computer program product. The computer program product includes one or more computer instructions. When the computer program is loaded and executed on the computer, the procedures or functions according to the embodiments of this present disclosure are all or partially generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. In this way, this application is intended to cover the modifications and variations of this application provided that they fall within the scope of the claims of this application and their equivalent technologies.

What is claimed is:

1. A network-based adaptive streaming media bit rate adjustment method, wherein the method comprises:
receiving, by an access network device, media quality of service (QOS) information from a session management network element, wherein the media QoS information comprises at least two bit rate indicators and QoS requirement information corresponding to each of the at least two bit rate indicators, and each bit rate indicator indicates a respective bit rate supported by a video server;
determining, by the access network device, a target bit rate indicator from the at least two bit rate indicators based on a current network condition and the media QoS information, wherein the current network condition meets a network requirement for transmitting streaming media data at a bit rate indicated by the target bit rate indicator, and determining, by the access network device, a target bit rate indicator from the at least two bit rate indicators based on the current network condition and the media QoS information comprises:
  monitoring, by the access network device, a network bandwidth; and
  in response to determining, by the access network device, a difference, within a target range, between the network bandwidth detected by the access network device and a target network bandwidth lasts for a target duration, determining, by the access network device from the at least two bit rate indicators, that a bit rate indicator for indicating a bit rate of media data is the target bit rate indicator, wherein a network bandwidth required for transmitting the media data at the bit rate is the target network bandwidth; and
  sending, by the access network device, the target bit rate indicator in the at least two bit rate indicators to a terminal or the video server.

2. The method according to claim 1, wherein the QoS requirement information corresponding to each of the at least two bit rate indicators indicates a network requirement for transmitting streaming media data at a bit rate indicated by a corresponding bit rate indicator.

3. The method according to claim 1, wherein the media QoS information further comprises buffer information, wherein the buffer information indicates a minimum buffer duration required for allowing video playing by the terminal, and the target duration is less than or equal to the minimum buffer duration.

4. The method according to claim 3, wherein the method further comprises:
  determining, by the access network device, the target duration based on the buffer information.

5. The method according to claim 1, wherein the media QoS information further comprises a media indicator, wherein the media indicator indicates a streaming media service with a network-based adaptive bit rate.

6. The method according to claim 1, wherein the QoS requirement information corresponding to each of the at least two bit rate indicators comprises a QoS profile corresponding to each of the at least two bit rate indicators.

7. The method according to claim 6, wherein the method further comprises:
  performing, by the access network device based on the QoS profile corresponding to the target bit rate indicator, QoS parameter configuration on a protocol data unit (PDU) session for streaming media data transmission; and
  sending the target bit rate indicator to a user plane network element.

8. The method according to claim 1, wherein the sending, by the access network device, the target bit rate indicator in the at least two bit rate indicators to a terminal or the video server comprises:
  sending, by the access network device, the target bit rate indicator via a radio resource control (RRC) message to the terminal or the video server; or
  sending, by the access network device, the target bit rate indicator via header information of a user plane downlink message to the terminal or the video server.

9. A network-based adaptive streaming media bit rate adjustment method, wherein the method comprises:
  receiving, by a session management network element, media network requirement information from a policy control network element, wherein the media network requirement information comprises at least two bit rate indicators and quality of service (QOS) information corresponding to each of the at least two bit rate indicators, each bit rate indicator indicates a respective bit rate supported by a video server, and the QoS information corresponding to each of the at least two bit rate indicators indicates a network requirement for transmitting streaming media data at a bit rate indicated by a corresponding bit rate indicator; and
  sending, by the session management network element, media QoS information to an access network device, wherein the media QoS information comprises the at least two bit rate indicators and QOS requirement information corresponding to each of the at least two bit rate indicators, wherein the at least two bit rate indicators are used for the access network device to determine a target bit rate indicator from the at least two bit rate indicators based on a current network condition and the media QoS information, the current network condition meets a network requirement for transmitting streaming media data at a bit rate indicated by the target bit rate indicator, and, in response to determining, a difference, within a target range, between a network bandwidth detected by the access network device and a target network bandwidth lasts for a target duration, the current network condition is determined to meet a network bandwidth requirement for transmitting the streaming media data at the bit rate.

10. The method according to claim 9, wherein the QoS requirement information corresponding to each of the at least two bit rate indicators indicates a network requirement for transmitting streaming media data at a bit rate indicated by a corresponding bit rate indicator.

11. The method according to claim 9, wherein the QoS requirement information corresponding to each of the at least two bit rate indicators comprises a QoS profile corresponding to each of the at least two bit rate indicators.

12. The method according to claim 11, wherein the method further comprises:
  sending, by the session management network element, first network QoS information to a terminal; and
  sending second network QoS information to a user plane network element, wherein the first network QoS information comprises the at least two bit rate indicators and a QoS rule corresponding to each of the at least two bit rate indicators, and the second network QoS information comprises the at least two bit rate indicators and a packet detection rule (PDR) corresponding to each of the at least two bit rate indicators.

13. The method according to claim 12, wherein the media QoS information further comprises at least one of buffer information or a media indicator, wherein the buffer information indicates a minimum buffer duration required for allowing video playing by the terminal, and the media indicator indicates a streaming media service with a network-based adaptive bit rate.

14. A network-based adaptive streaming media bit rate adjustment method, wherein the method comprises:
  receiving, by a terminal, a target bit rate indicator from an access network device, wherein a current network condition meets a network requirement for transmitting streaming media data at a bit rate indicated by the target bit rate indicator, the target bit rate indicator is one of at least two bit rate indicators, each of the at least two bit rate indicators indicates a respective bit rate supported by a video server, the at least two bit rate indicators are used for the access network device to determine the target bit rate indicator from the at least two bit rate indicators based on the current network condition and media QoS information, and, in response to determining a difference, within a target range, between a network bandwidth detected by the access network device and a target network bandwidth lasts for a target duration, the current network condition is determined to meet a network bandwidth requirement for transmitting the streaming media data at the bit rate indicated by the target bit rate indicator; and sending, by the terminal, a streaming media data obtaining request to the video server based on the target bit rate indicator, wherein the streaming media data obtaining request comprises a streaming media data obtaining address corresponding to the target bit rate indicator.

15. The method according to claim 14, wherein the method further comprises:

receiving, by the terminal, media manifest from the video server, wherein the media manifest comprises the at least two bit rate indicators; or obtaining, by the terminal, the at least two bit rate indicators from the access network device.

16. The method according to claim 15, wherein the sending, by the terminal, a streaming media data obtaining request to the video server based on the target bit rate indicator comprises:

when current buffer duration is less than or equal to a first threshold, sending, by the terminal, the streaming media data obtaining request to the video server based on the target bit rate indicator.

17. The method according to claim 15, wherein the method further comprises:

receiving, by the terminal, first network quality of service QoS information from a session management network element, wherein the first network QoS information comprises the at least two bit rate indicators and QoS rules corresponding to the at least two bit rate indicators; and performing, by the terminal according to a QoS rule corresponding to the target bit rate indicator, QoS parameter configuration on a protocol data unit (PDU) session for streaming media data transmission.

18. The method according to claim 14, wherein the sending, by the terminal, a streaming media data obtaining request to the video server based on the target bit rate indicator comprises:

when current buffer duration is less than or equal to a first threshold, sending, by the terminal, the streaming media data obtaining request to the video server based on the target bit rate indicator.

19. The method according to claim 14, wherein the method further comprises:

receiving, by the terminal, first network quality of service (QOS) information from a session management network element, wherein the first network QoS information comprises the at least two bit rate indicators and QoS rules corresponding to the at least two bit rate indicators; and performing, by the terminal according to a QoS rule corresponding to the target bit rate indicator, QoS parameter configuration on a protocol data unit (PDU) session for streaming media data transmission.

\* \* \* \* \*